(12) United States Patent
Cheng

(10) Patent No.: US 11,611,119 B2
(45) Date of Patent: Mar. 21, 2023

(54) BATTERY MODULE, BATTERY DEVICE, AND BATTERY SYSTEM HAVING THERMAL MANAGEMENT DESIGN

(71) Applicant: Ming Yao Cheng, Taipei (TW)

(72) Inventor: Ming Yao Cheng, Taipei (TW)

(73) Assignee: YUN ENERGY LIMITED COMPANY, Taipei (TW)

( * ) Notice: Subject to any disclaimer, the term of this patent is extended or adjusted under 35 U.S.C. 154(b) by 135 days.

(21) Appl. No.: 16/603,578

(22) PCT Filed: Apr. 10, 2017

(86) PCT No.: PCT/CN2017/079902
§ 371 (c)(1),
(2) Date: Mar. 2, 2020

(87) PCT Pub. No.: WO2018/187901
PCT Pub. Date: Oct. 18, 2018

(65) Prior Publication Data
US 2020/0220240 A1    Jul. 9, 2020

(51) Int. Cl.
| | |
|---|---|
| *H01M 10/00* | (2006.01) |
| *H01M 10/6556* | (2014.01) |
| *H01M 10/6552* | (2014.01) |
| *H01M 10/658* | (2014.01) |
| *H01M 10/44* | (2006.01) |

(52) U.S. Cl.
CPC ..... *H01M 10/6556* (2015.04); *H01M 10/443* (2013.01); *H01M 10/658* (2015.04); *H01M 10/6552* (2015.04)

(58) Field of Classification Search
CPC ......... H01M 10/6556; H01M 10/6551; H01M 10/6552; H01M 10/655; H01M 10/658; H01M 10/6561; H01M 10/6567; H01M 10/443; H01M 10/441
See application file for complete search history.

(56) References Cited

PUBLICATIONS

Abstract of CN 106532178, Zhang et al, "Battery pack temperature control device, temperature control method and vehicle", published Mar. 22, 2017.*

* cited by examiner

*Primary Examiner* — Raymond Alejandro
(74) *Attorney, Agent, or Firm* — Raymond Chan

(57) ABSTRACT

The present invention utilizes a three-stage thermal management design of battery module, battery device, and battery system that not only prevents the battery cells from being impacted by the environment temperature, but also efficiently controls the temperature of the battery cells, such that the battery cells can reach the requirements of temperature equalization and appropriate opening temperature. The thermal management design of the battery module is mainly a design of a battery cell charging and discharging circuit having heat exchange.

5 Claims, 20 Drawing Sheets

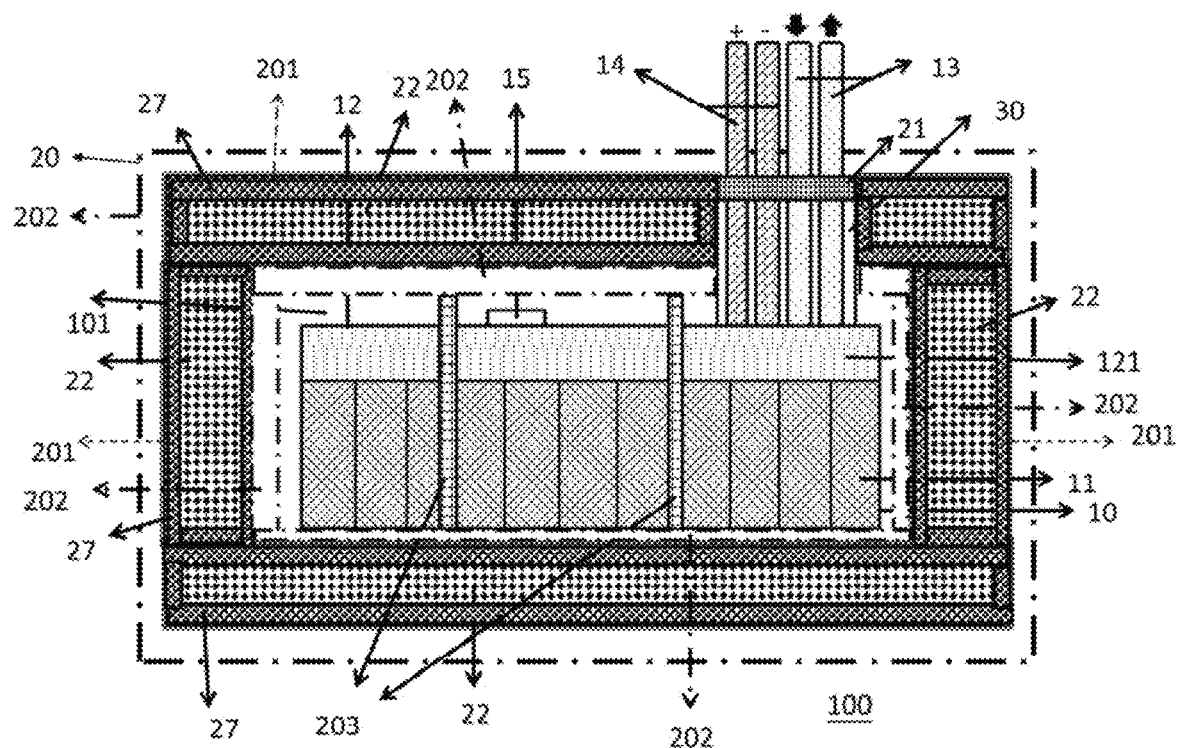
Fig.1i-(1)
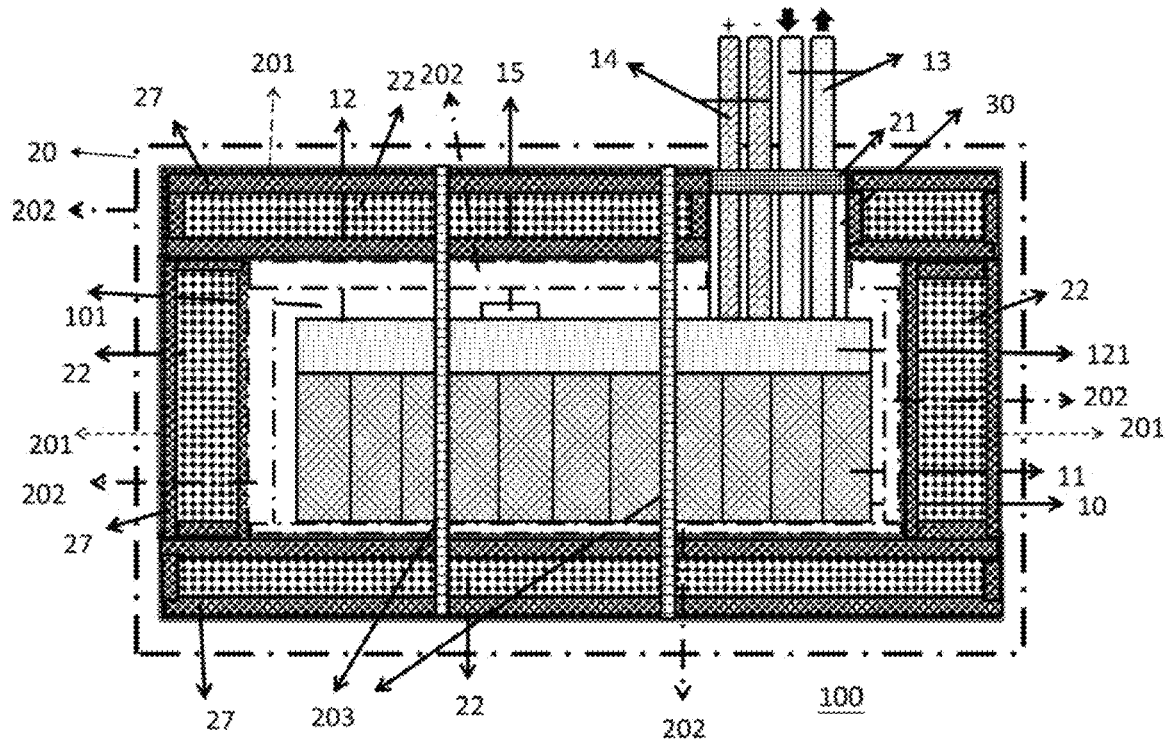
Fig.1i-(2)

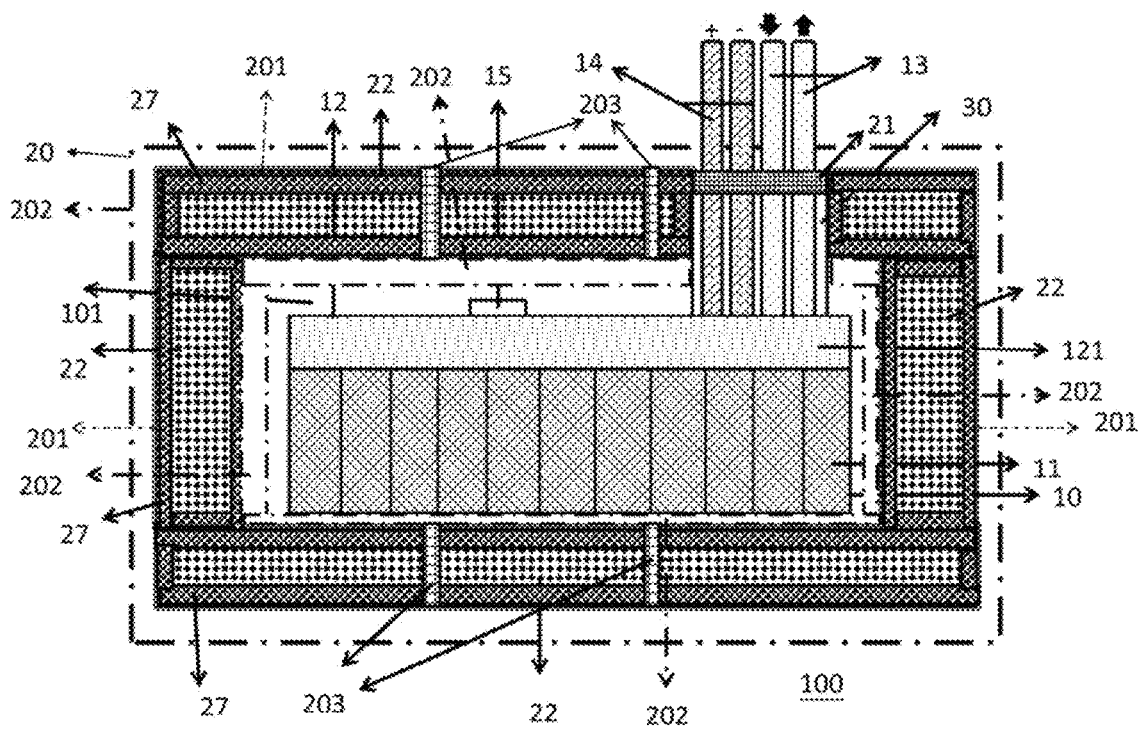
Fig.1i-(3)
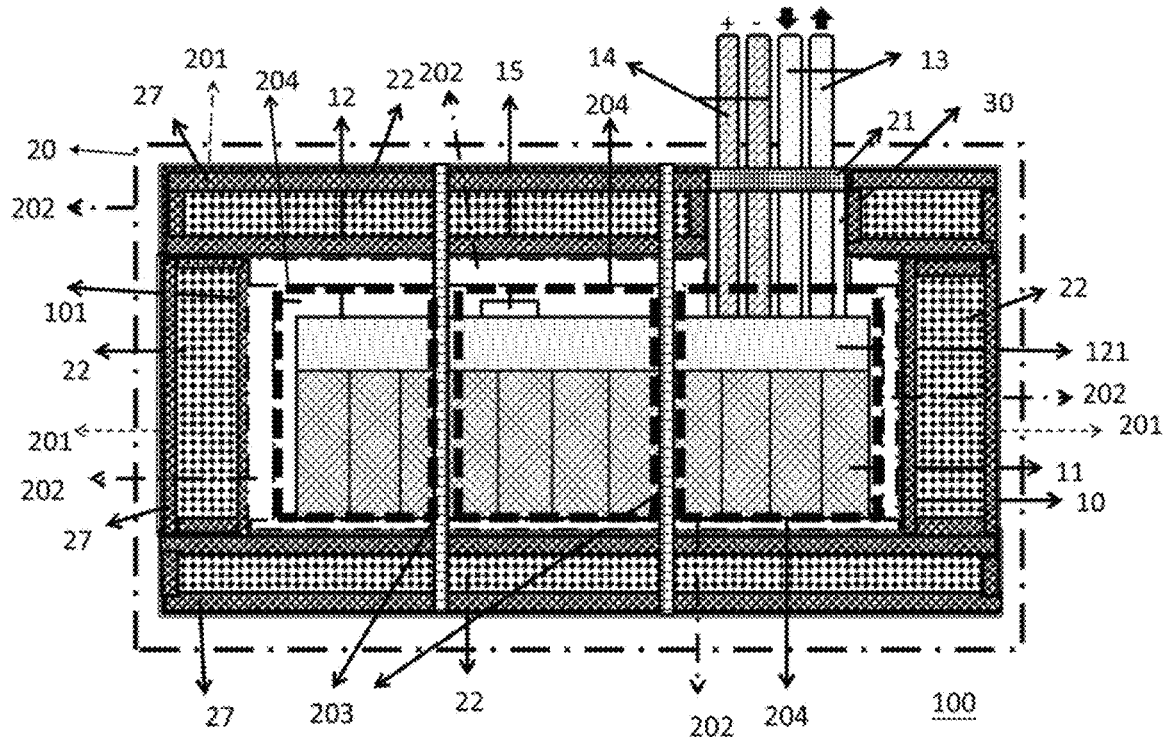
Fig.1i-(4)

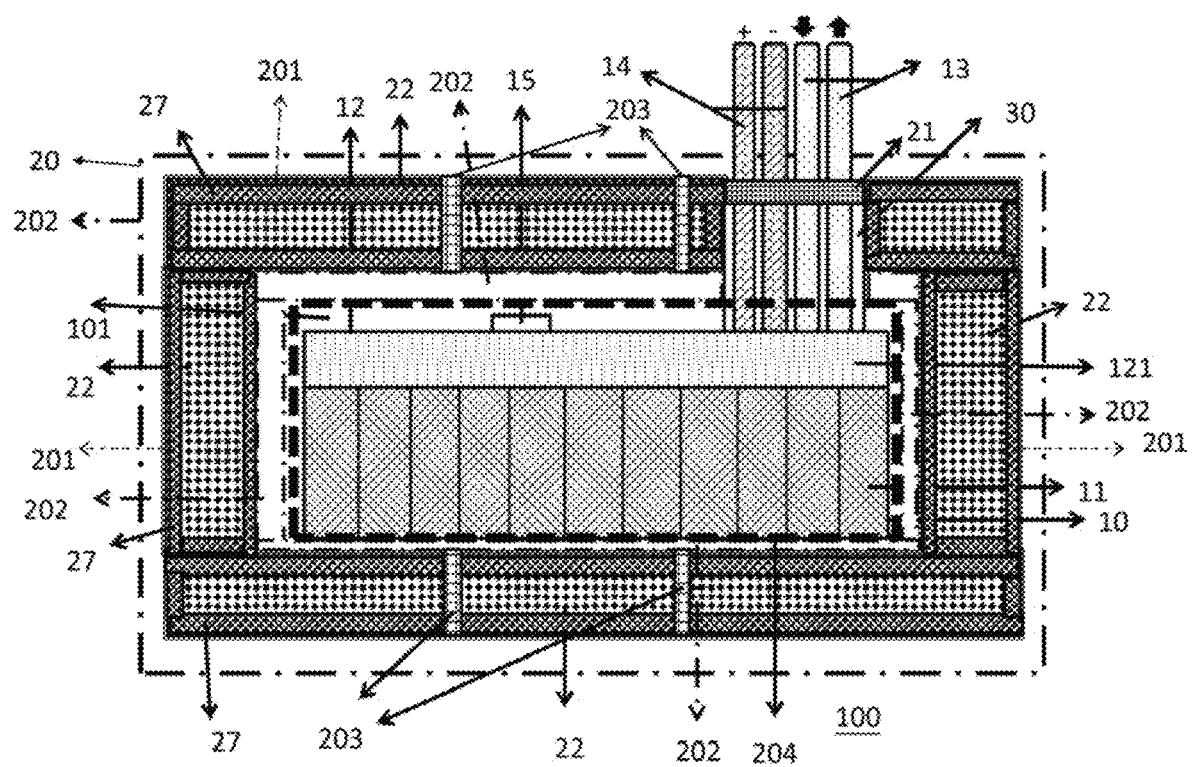
Fig.1i-(5)

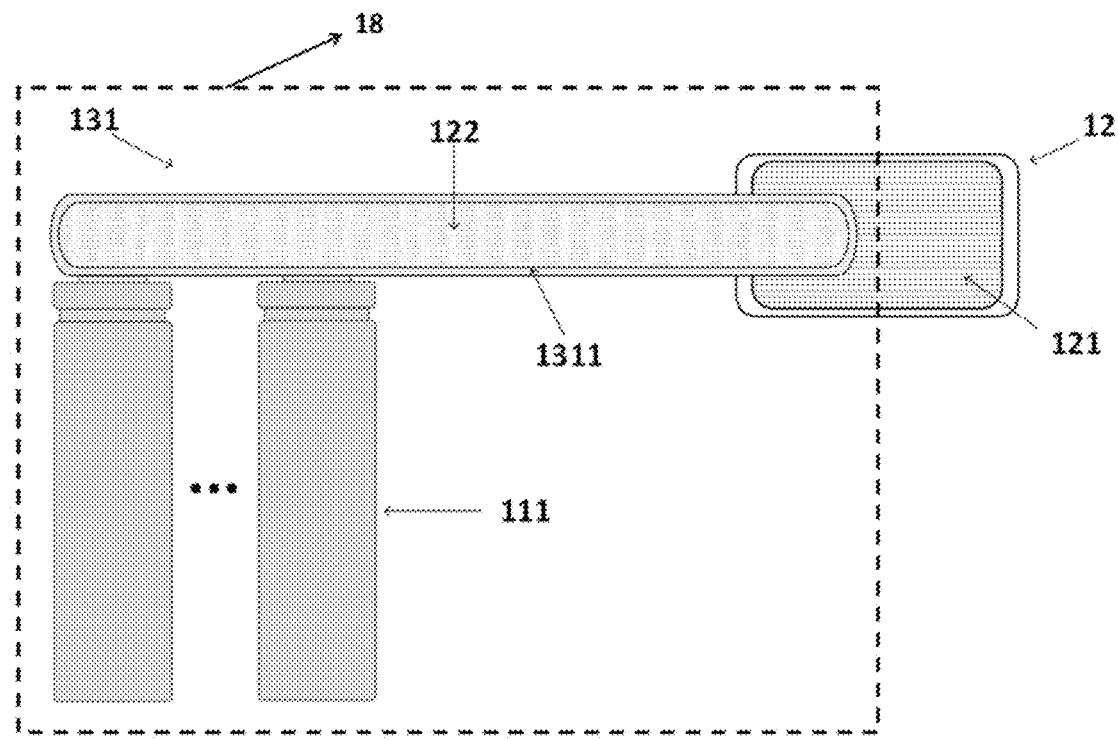
Fig.3a-(1)
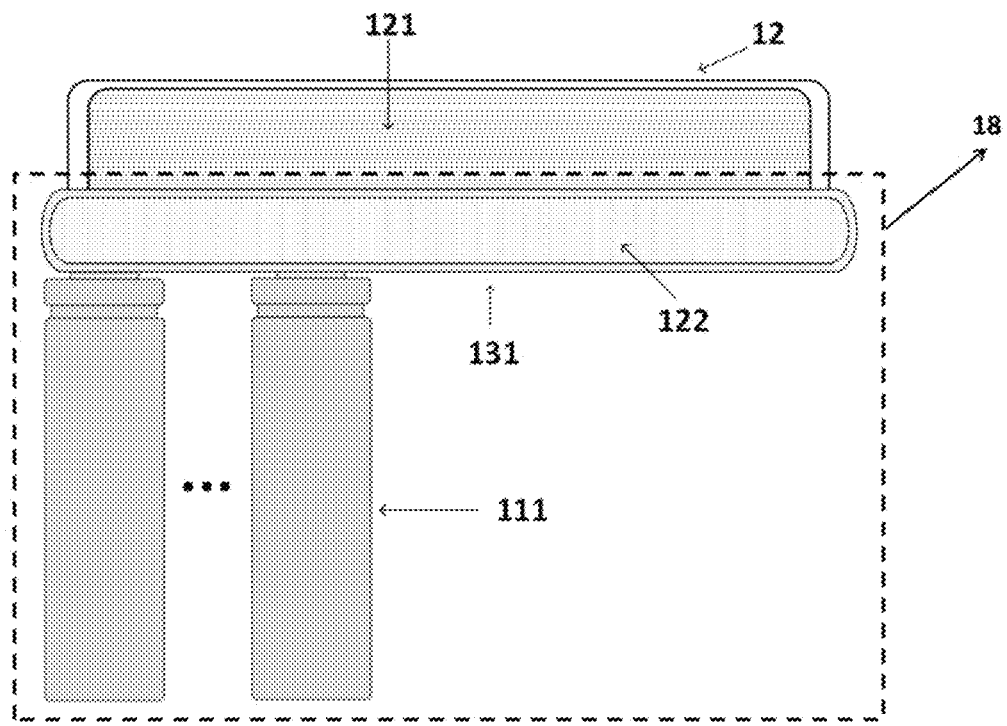
Fig.3a-(2)

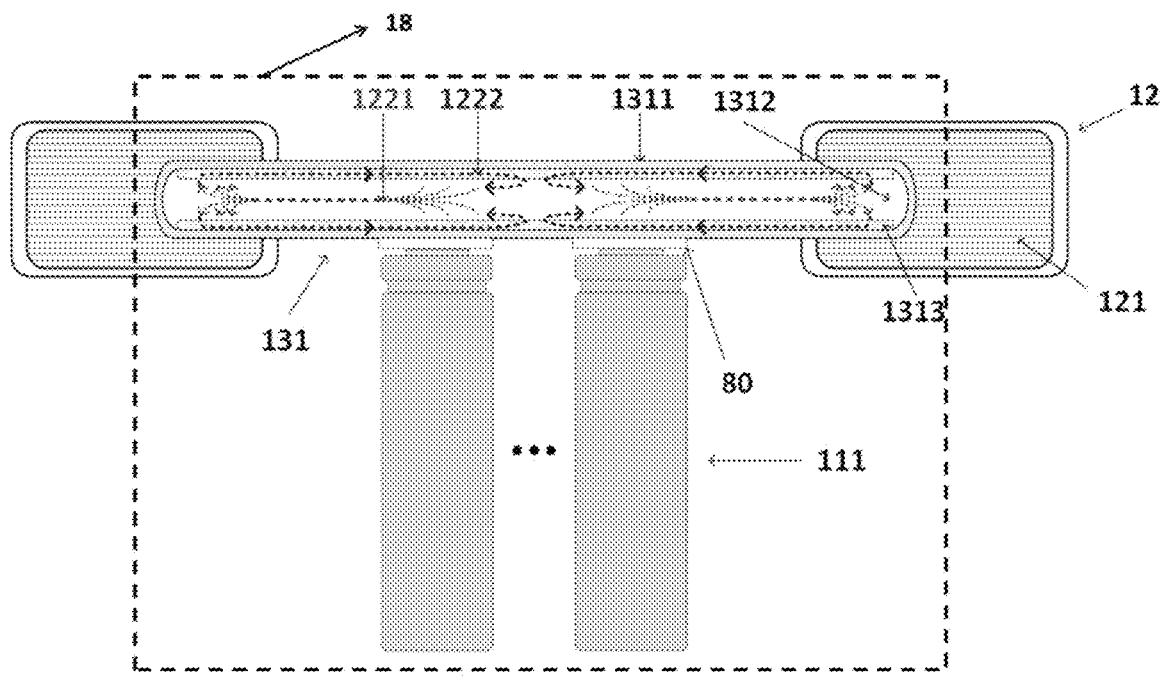
Fig.3d
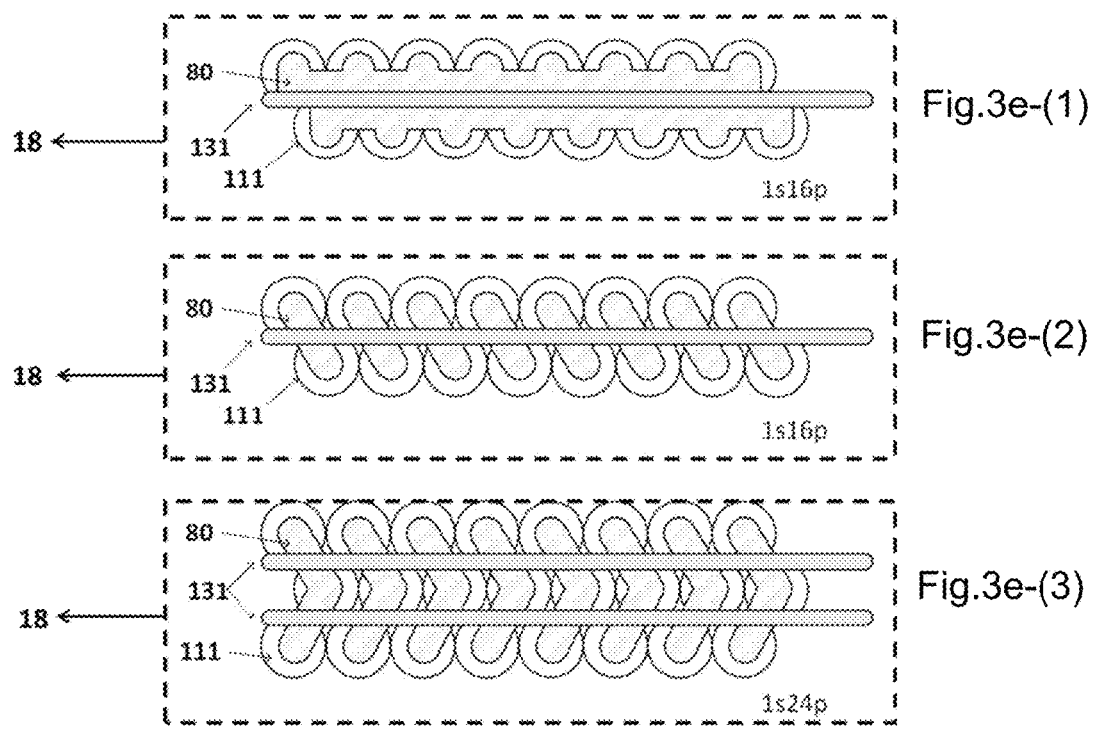
Fig.3e-(1)
Fig.3e-(2)
Fig.3e-(3)

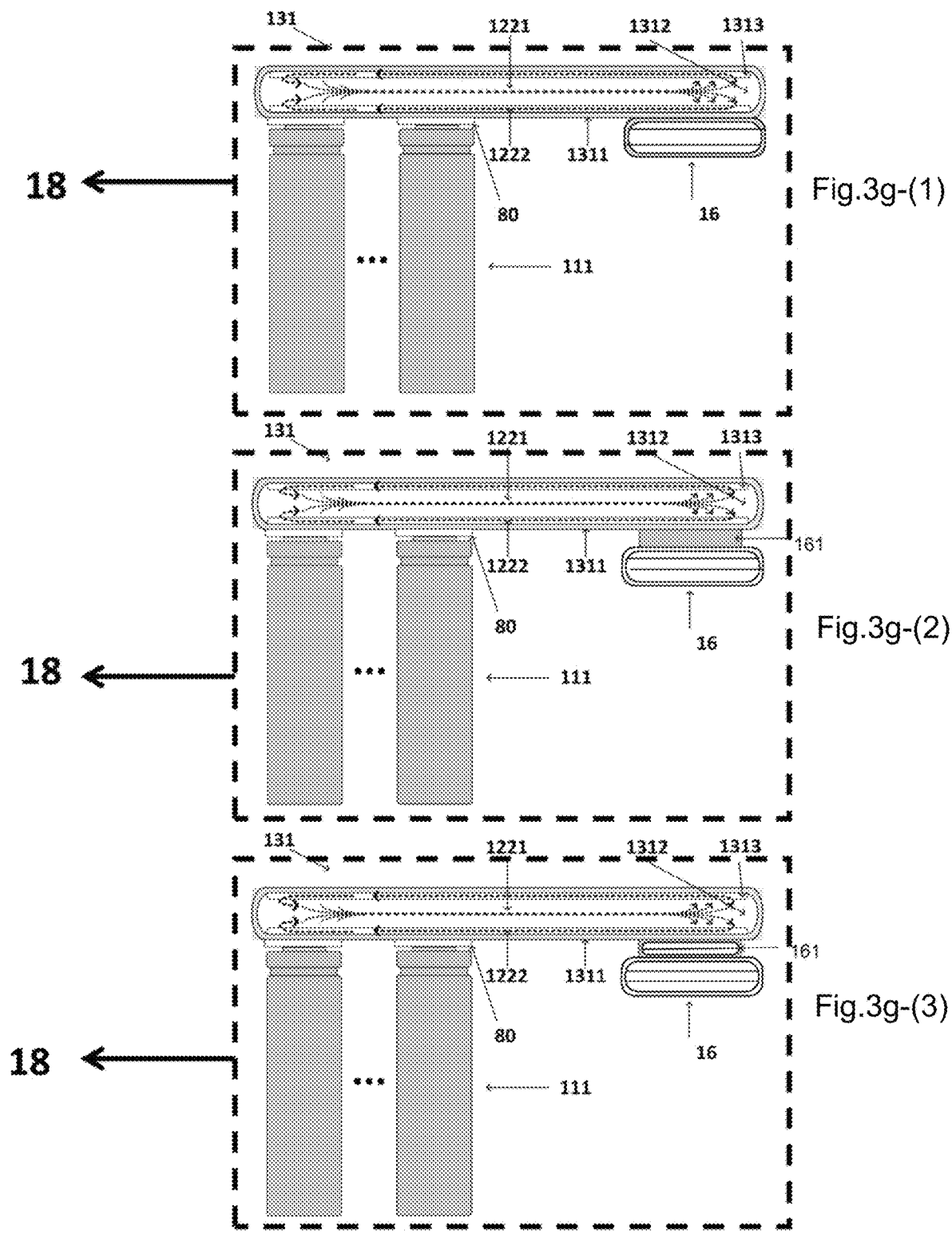

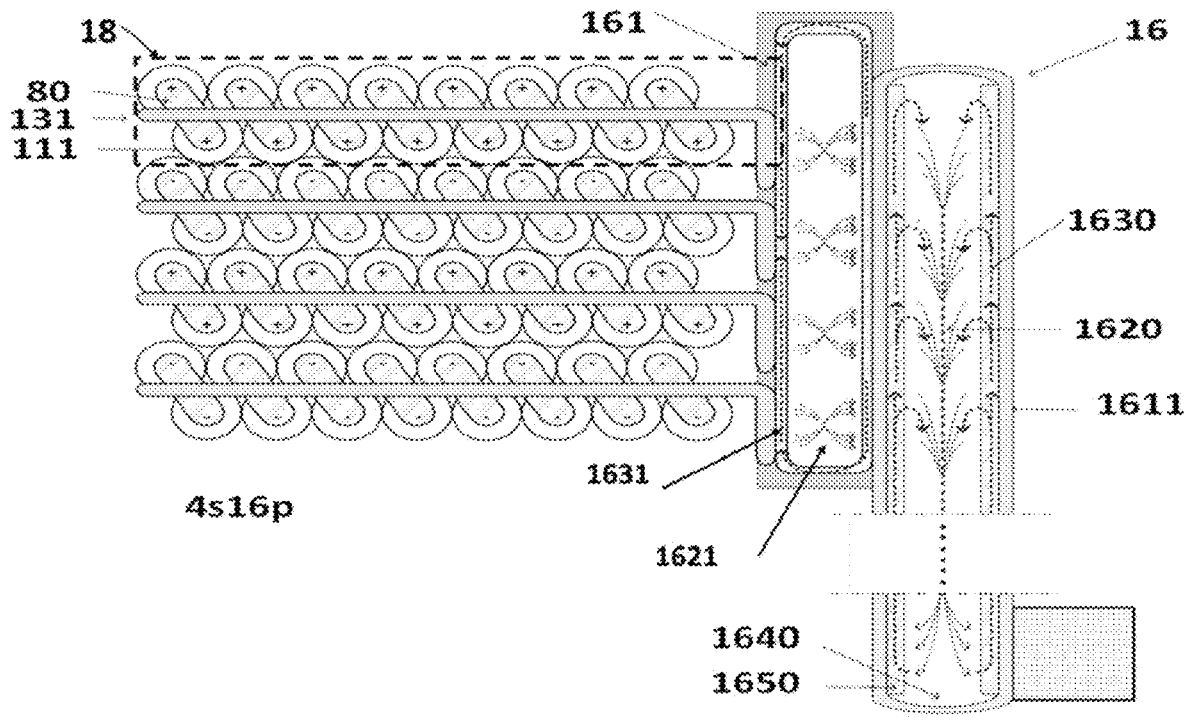
Fig.3g-(4)
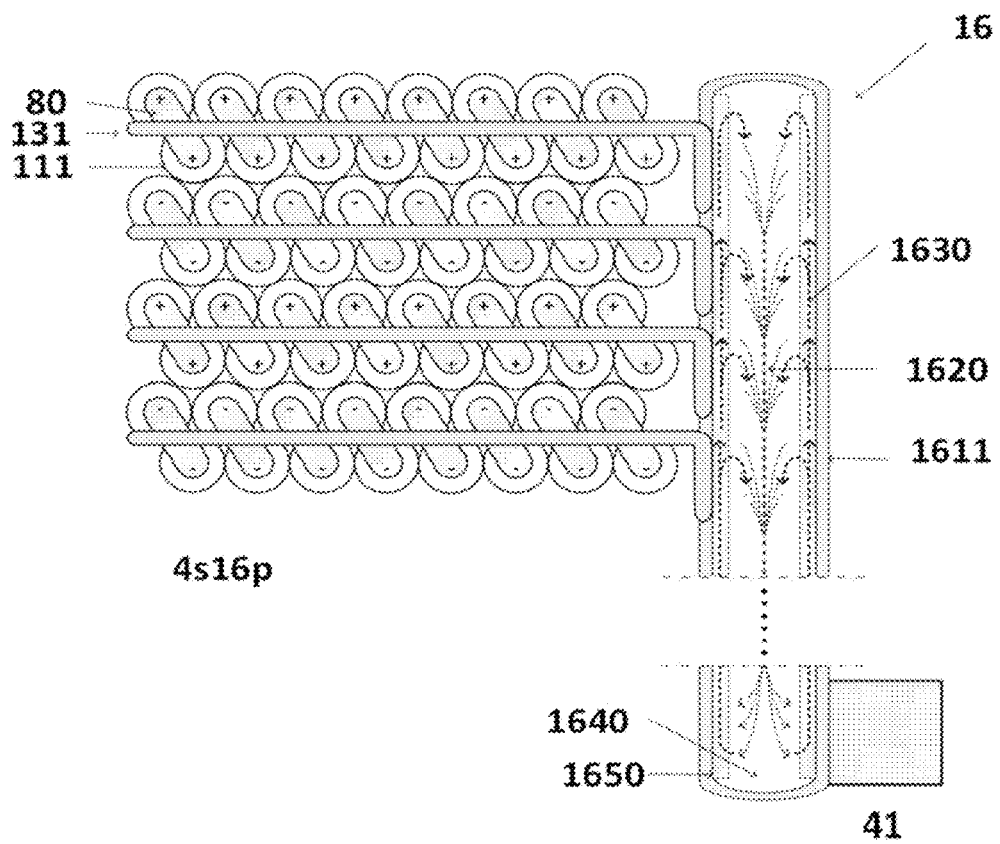
Fig.3g-(5)

BATTERY MODULE, BATTERY DEVICE, AND BATTERY SYSTEM HAVING THERMAL MANAGEMENT DESIGN

NOTICE OF COPYRIGHT

A portion of the specification contains material which is subject to copyright protection. The copyright owner has no objection to any reproduction by anyone of the specification, as it appears in the United States Patent and Trademark Office patent files or records, but otherwise reserves all copyright rights whatsoever.

BACKGROUND OF THE PRESENT INVENTION

Field of Invention

The present invention relates to a battery module, battery device, and battery system having thermal management design, and more particularly to a high efficient thermal management design for battery device and battery module, which is capable of significantly reduce the impact of environmental temperature to a battery device, so as to not only extend the service life of the battery cells, but also enhance the performance of the battery cells and the convenience to the user based on this overall thermal management design of the battery system.

Description of Related Arts

The convenience and economic value of petroleum to the world is comprehended without being told. Unfortunately, although the utilization of fossil fuel as the primary energy, such as coal being utilized for electricity generation of a power plant and gasoline/diesel being used as fuel for internal combustion engine (ICE) vehicles, nevertheless the generated carbon dioxide and other micro toxic gas during the usage of fossil fuels makes a big impact of our environment. Various kinds of clean energy technologies, e.g. wind power, geothermal, and solar power energy technologies, have been considered and developed with the aids of energy storage systems. One of the most promising energy storage systems/technologies is the electrochemical secondary battery technology, including lead-acid battery, nickel-metal hydride (Ni-MH) battery, lithium-ion battery, and so on.

Due to its high energy density and operation life, Lithium-ion battery has been mostly considered as the battery energy storage solution for various applications, for example, laptops, smartphones, and other mobile devices. Meanwhile next-generation lithium-ion battery is also developed for electric vehicles, micro-grid, and other energy storage applications to tackle the impact of fossil fuels, although more improvement has been anticipated. In case of electric vehicles, lithium-ion battery has been deployed as the energy sources (lithium-ion battery coupled with internal combustion engine in series or in parallel for hybrid electric vehicles). Lithium-ion battery of higher energy density is required to satisfy an expected mileage more than 400-500 km per charge. Meanwhile better improvement of battery performance, service life, safety, and cost are needed as well.

In terms of performance, service life, and safety of lithium-ion battery, improvements can be done from two aspects. On one hand. lithium ion battery is able to improve with the advance of the associated materials and cell design. On the other hand, a better battery system could compromise the weakness of current lithium-ion battery cell technology, which is mostly associated with the temperature of the lithium-ion battery. The control of the battery temperature strongly correlates with its performance, service life, and safety. For lithium-ion battery, proper operating temperature ranges from −20 to 60° C. For charging process, the temperature especially limits within 0 to 50° C. Furthermore, the temperature of lithium-ion battery for electric vehicles is even controlled between 15 and 35° C. Higher battery operation temperature leads to safety concern with less service life. Lower battery operation temperature may further result in limited performance and low energy efficiency due to high impedance of the battery. Practically the environments of various kinds of applications are not always under favorable conditions.

Most of the cases battery thermal management is highly required for performance, long endurance life, and even for safety purpose. For example, parking electric vehicles under full sun in summer may lead to extremely high battery temperature; on the other hand, the parked electric vehicles in crucial winter results in battery under unacceptable low temperature (<0° C. or even lower), which long heat-up time is needed especially for battery charging. Taking UPS (uninterruptable power supply) as another example, UP SA lead-acid battery-based UPS for data center power backup usually needs to maintain the environmental temperature within 25-30° C. For lithium-ion battery-based one, it has to be kept below 35-40° C. for targeted service life. The two examples explain the importance of battery thermal management, in order to satisfy the demands of battery performance, service life, and safety for various kinds of applications. Further, consideration to energy efficiency for battery thermal management is essential in some cases for less operation cost as well as better user experience. Taking battery electric vehicles as example, 30% the round trip mileage per charge may be reduced for driving in winter, which is resulted from both the energy to heat up the battery system and low temperature energy loss from the electric vehicle battery itself.

Besides the impact of environmental temperature, the difference of temperature among battery cells of a battery system is important as well. It is known that substantial battery cells properly connected in series or parallel are practical for a battery pack/system. Based on the application, the quantity of battery cells of one battery pack/system can range from hundreds to thousands or higher. Larger temperature difference during operation or storage may cause difference in degree of aging among battery cells and battery modules. Serious aged battery cells and battery modules will be the burden of the entire battery pack/system, and further accelerating the aging of other battery cells and battery modules, and eventually the whole battery pack/system.

It is noted in previous paragraphs that temperature plays a critical role for electrochemical secondary batteries in various applications. Therefore a good battery thermal management design of high energy and time efficiency is necessary, which allows the battery to cope with various kinds impacts like battery performance, service life, and safety resulted from the associated temperature issues. The requirement can be found in various energy storage devices, such as lithium-ion batteries for electric vehicles, for energy storage systems of outdoor solar energy generating system, for UPS of both telecommunication stations and data centers, and for micro-grid associated applications.

Conventionally, battery thermal management solutions can be divided into both passive and active ones. A passive thermal solution is to utilize the concept of heat conduction mechanism for battery system design so that the heat produced by the battery will be conducted to the interface between the battery system and the external environment, and is followed by dissipation via natural convection of the external atmosphere. As mentioned above, the passive battery thermal solution is simple and easy to design with cost benefit. Nevertheless the large temperature difference (low temperature uniformity) among the battery cells and modules with low heat dissipation efficiency is usual.

Moreover, the temperature of the battery pack system can be easily impacted by the environmental temperature since the heat conduction path designed for battery cells/modules heat dissipation can be utilized for battery cells/modules heating in summer and cool down in winter, respectively. In electric vehicle related applications, though the external air can be forced introduction into the battery system through flow channel for cooling purposes, proper battery temperature maintenance for low temperature environment operation can still be an issue. It is even worse while cranking an electric vehicle in cold. The low battery temperature impacted by the environment is not able to be avoided, which may then shorten the service life of the battery.

An active thermal solution is to utilize a temperature control medium or resistive heating devices to control the temperature of the battery cells/modules in a battery pack system. The said temperature control medium is usually a gas or liquid. For gas medium, a fan is needed for heat dissipation of battery cells/modules. However, for battery heating up in low temperature environment, an additional heating device is still needed. By the way, the needs of gas channels in battery pack system makes lower battery energy density, which is a drawback for battery pack demands in some applications like electric vehicles. Further, the active battery thermal solution with gas as medium usually leads to large temperature difference among battery cells and modules, resulting in obvious difference in performance and service life among the battery cells and modules.

Liquid medium-based active thermal solution shows relatively higher efficiency with compact battery system to that of gas medium-based one. Generally speaking, battery cells or modules are able to form good thermal contact with liquids circulated in flow channels apparatus with the aids of compressor and heating device outside the battery device for liquid temperature control. The conditioned liquids are subsequently introduced to liquid-battery cells/modules thermal interface through flow channels apparatus to adjust the temperature of battery cells or modules. Due to safety concern, the heat conduction path from liquids in the flow channel apparatus to battery cells/modules usually contains at least one non-metallic or non-electrical conductive material. which is based on plastics or other suitable polymers, for short circuit-proof purpose among the battery cells/modules in the battery system. It is known that some of the thermally conductive polymer materials recently show obvious improvement in the associated thermal conductivity, those materials are still not able to compete with metals in terms of thermal conductivity. For example, the thermal conductivity of copper and aluminum are respectively 400 and 230 W/(m K), which is tens or even hundreds times higher than that of thermally conductive polymers, resulting in higher thermal resistance in the associated heat conduction path and subsequently low cooling rate. Further, the liquid circulation route distance of the flow channel apparatus in the battery system is usually long, even better than gas case, rendering substantial temperature difference among battery cells/modules inside. In addition, risk of liquid leakage is accompanied with the long route distance of the flow channel apparatus in the battery system.

A conventional art, Taiwan Pat. No. TW201401611 entitled "Waterproof, Fireproof, Shockproof, Explosion-proof Four-in-one Vehicle Battery and Manufacture Method Thereof disclosed a vehicle battery system is composed of a plurality of LFP cells (lithium iron phosphate-based lithium-ion cells), at least a bracket, an electric connection module, and a sealing material. Here, the LFP cells are assembled in the bracket and electrically connected through the electric connection module. Then, the LFP cells, the bracket, and the electric connection module are completely embedded the sealing materials under vacuum. According to prior art, the sealing material is a kind of thermal conducting gel which is able to fill into the gaps under vacuum, and subsequent shows waterproof, fireproof, shockproof, and explosion-proof benefits. In addition, the generated heat of LFP cells can be dissipated through the sealing material, which ensures the safety and the stability during battery operation. Unfortunately, the thermal conductivities of state-of-the-art thermal conducting gels are not as high as expected for heat dissipation of the batteries during operation. Further, the design is not able to deal with harsh environment which the temperature beyond the suitable operation window of LFP cells. By the way in case the cell vent opens due to high cell temperature caused by any issues, the high pressure inside the cell is not able to be released in time, which is of high risk for safety A prior art, US Pat. No. 20060110657 "Battery assembly for use in an uninterruptible power supply system and method", provides a battery as an uninterruptible power supply. The heat dissipating device and method of the battery is to use a cable wire to conduct the heat generated from the battery module via connection from the battery electrode terminals to a heat dissipation fin device outside the battery. The cable wire is accompanied with an electrical insulation part between the battery electrode terminal and the external heat dissipation fin. The heat conducted to the fins will be dissipated with a fan. In case the battery needs to be heated up, an internal heater plays the role. It is said that the heat dissipation mechanism of the invention seems to be workable, but the heat dissipation path can also be utilized to heat up the battery to unfavorable temperature level for high temperature environment. Similarly, low temperature environment will continuously withdraw the heat from the battery even heater has been employed for maintaining battery temperature. Therefore, the invention in practical fails to provide effective thermal management to the battery.

A prior art, US Pat. No. 20130071705 "Structure, Packaging Assembly, and Cover for Multi-cell Array Batteries", offers a package structure and cover of a battery with a plurality of battery cells, which utilize a divided structure for battery packaging assembly with the aids of a vacuum insulation plate (VIP) as covers, which is able to reduce the impact of the environmental temperature to the battery inside. Clearly, this invention mainly focuses on package and storage during battery delivery but not for the design of an operation battery system. It is thus not associated with the thermal management design of a battery system.

To the best of our knowledge, no proper solution is able to operate battery in high energy efficiency under harsh temperature environment, and thus to enhance battery service life, total accumulated battery capacity, cell performance uniformity and better user convenience. To realize the above mentioned battery solution, the present inventor has offered the present invention, "battery module, battery device, and battery system having thermal management design," which starts from the both the temperature uniformity and quick thermal conditioning characteristic for battery module level design; and is accompanied with the thermal insulation technology and the active-passive composite thermal management design for the both battery device level and battery system level designs, respectively. Based on the requirement of both high energy and time efficiencies, the targets for quick cell thermal conditioning benefit and less temperature difference among battery cells of the battery system are able to be achieved. Subsequently the user convenience of the battery system is able to be greatly improved regardless of the temperature environments. Thanks to the enhancement of the energy efficiency, the total available capacity and service life of the battery device can be further improved. In other words, less battery energy is consumed for thermal management. In addition, the battery device is capable to be applied in adverse temperature environments, and the degree of complexity of the battery management has been reduced.

SUMMARY OF THE PRESENT INVENTION

An object of the present invention is to provide a battery module, battery device, and battery system having thermal management design, which can greatly reduce the impact of the environmental temperature to the battery device and battery system utilized in electric vehicle or other applications. Meanwhile, both quick thermal conditioning characteristic of the battery cells and battery modules in the battery device, and less temperature differences among the battery cells are available, resulting in high energy and time efficiencies, and long service life of the battery device. The battery module, according to the present invention, is defined as the one composed of a plurality of battery cells connected in parallel to form parallel set(s) with thermal management design, a plurality of parallel set(s) connected in series if necessary, and the associated circuits for voltage and temperature sensing, and etc.. The battery device is the one having a plurality of the battery modules being connected in series and/or in parallel, and then combined with battery management system (BMS), thermal management design, and other apparatus(es) (if any). The battery system further includes battery device(s) as well as the associated adaptors for charger and discharging load, temperature control device, master control device (including temperature control, external interface communication), and etc.. One of the main features of the battery system of the present invention is to utilize a temperature control medium, circulated in the battery device, which has to be conditioned outside the battery device in advance. The conditioned medium is then introduced into the battery device via either an active or passive means to proceed heat exchange with the battery module(s).

An object of the present invention is to provide a battery module, battery device, and battery system having thermal management design, wherein another main feature of the battery system is to further comprise a temperature control medium circulation device. If the temperature control medium is the said system fluid, then the circulation device is the system fluid circulation device. The said circulation device comprises a system fluid served as the temperature control medium, a system fluid pipe, and a system fluid temperature control device. The system fluid circulation device may further comprise a device adaptable for actively transporting and delivering the conditioned system fluid for circulation, which is a system fluid delivery device or a system fluid storage device for storage of the conditioned system fluid. All the above mentioned devices can be connected in series or parallel for further integration into the system fluid circulation device. The system fluid temperature control device decides via a proper control logic if the system fluid has to be heated up or cooled down, and subsequently to be introduced actively via the system fluid delivery device or passively via physical changes of the conditioned system fluid itself for circulation. In this manner, the conditioned system fluid is able to adjust the temperature of the battery modules of the battery device or, under certain circumstances, be pre-stored in a thermally insulated system fluid storage device for the heat exchange with the battery modules afterwards. All these mechanisms allow the inside battery cells to achieve a fast and high energy efficient thermal management.

An object of the present invention is to provide a battery module, battery device, and battery system having thermal management design, wherein a main feature of the battery device is to provide an enclosure of high thermal insulation capability. In case of harsh external environmental temperature which is higher or lower than proper temperature window of battery operation, the temperature of the battery cells inside the enclosure-wrapped battery device can be prevented from the impact of the external harsh conditions. In case of partially enclosure-wrapped battery device, the associated battery cells can be thermally insulated with certain level of thermal impact reduction from the external environment An object of the present invention is to provide a battery module, battery device, and battery system having thermal management design, wherein another main feature of the battery device is to comprise a thermal insulation unit and a structural unit for the above mentioned enclosure. The configuration of the structural unit can be layered, sticklike, or layer-stick mixed style with single/multiple thermal unit(s) for enclosure design. The associated thermal insulation unit(s) can further contain a vacuum layer, wherein the atmosphere pressure of the vacuum layer is lower than 0.01 Pa, or an even better one to be lower than 0.001 Pa. According to various requirements, the atmosphere pressure of the vacuum layer could be maintained through an additional vacuum apparatus outside or in the battery system for thermal insulation purpose of the enclosure, which does reduce the impact of the environmental temperature to the temperature of the battery cells inside the battery modules.

An object of the present invention is to provide a battery module, battery device, and battery system having thermal management design, wherein another main feature of the battery device is that the thermal insulation unit of the enclosure can further include a thermal insulation material as the main component of the thermal insulation unit; or coupled with a vacuum layer to form a composite thermal insulation unit.

An object of the present invention is to provide a battery module, battery device, and battery system having thermal management design, wherein a main feature of the battery module is that the battery module is capable of conducting fast heat exchange. The battery module is composed of at least a battery cell and a heat exchange pipe, wherein the heat exchange pipe is directly or indirectly connected, contacted, or engaged with the positive terminal and/or negative terminal of the battery cell, so as to form a heat exchange circuit of battery charge and discharge. That is, the heat exchange pipe acts as both heat exchange medium, and current conducting path during charging and discharging process for the battery cell. In the heat exchange circuit of battery charge and discharge, the heat exchange pipe is at least partially directly or indirectly contacted with the temperature control medium, so as to form a module heat exchange interface for fast heat exchange between the battery cell(s) of the battery module and the temperature control medium through the heat exchange pipe. The temperature control medium is a medium for temperature control device outside the battery module to adjust the temperature of the battery module. If the battery module is correlated with the battery device and/or the battery system having thermal management design of this invention, the temperature control medium can be the system fluid. In this sense the temperature control medium is not only to assist the battery cells of the battery module and the battery modules of the battery device to achieve fast and high energy efficient thermal management, but a plurality of the battery cells connected with the same heat exchange pipe show uniform temperature distribution thank to the fast heat exchange characteristic of the heat exchange pipe. The battery device comprises a conduit, called flow channel device, arranged thereon, to be connected, engaged, or coupled with the battery module for introducing the conditioned system fluid from outside the battery device inside and subsequently heat exchange with the module heat exchange interface of the battery module. If the battery device comprises multiple battery modules, multiple flow channel devices are able to be connected in series, so as to allow the system fluid to exchange heat with all the battery modules. In such case, the first and last flow channel devices that the system fluid flows into and out from the battery device are respectively connected with different system fluid pipes of the system fluid circulation device of the battery system. In other word, the two system fluid pipes are the path for the system fluid to communicate with the battery device.

An object of the present invention is to provide a battery module, battery device, and battery system having thermal management design, wherein another main feature of the battery module is that the heat exchange pipe is made of metal, so as to act as a current path during charging and discharging the battery cells. Since the current usually involves a plurality of battery cells, the resulting high current induces larger heat generation. Hence, the high thermally conductive heat exchange pipe is able to deal with the heat generated by the charging and discharging current path and the battery cells and to exchange between the system fluid in the flow channel device and the module heat exchange interface. On the contrary, if the battery cells are needed to be heated up, the same route described can be utilized. Subsequently the heat is able to be well distributed via the heat exchange pipes to all the connected battery cells quickly, so as to implement a fast and high energy efficient thermal management for the battery cells of the battery module. Based on the above design, there are two main functions for the battery module, battery device, and battery system having thermal management design of this invention, including fast temperature control and thermal isolation of the environment, so as to achieve high energy efficiency and fast thermal management based on various needs.

The battery module, battery device, and battery system having thermal management design of the present invention can greatly reduce the impact of the environmental temperature and rapidly adjust the temperature of the battery device to a proper temperature operation window, such as 15-35° C., with the advantages of high energy efficiency and fast heat exchange. Therefore, the logic of battery device operation and control, such as charging and discharging processes, safety management, and etc., is able to be substantially simplified, so as to avoid the difficulties of the operation under high or low environmental temperature.

In order to achieve the above object, the present invention provides a battery system having thermal management design, which comprises a battery device and a system fluid circulation device, wherein the system fluid circulation device provides a system fluid needed for heat exchange with the battery device via the required heat exchange process.

According to an embodiment of the present invention, the battery device of the battery system having thermal management design can be the battery device comprising a battery module, an enclosure, a set of positive and negative electrical terminal cable wire, and a flow channel device, wherein the flow channel device has a system fluid disposed therein, such that, by means of connecting, coupling, and engaging the flow channel device and the battery module, the system fluid is able to be of directly or indirectly contact with the battery module for heat exchange, wherein the enclosure comprises a thermal insulation unit, a structural unit, and a channel, wherein the thermal insulation unit shows excellent thermal insulation capability, such that the impact of the external environmental temperature to the battery module of the battery device is effectively avoided.

According to an embodiment of the present invention, the system fluid circulation device of the battery system can further comprise a system fluid pipe coupled, connected, or integrated with the associated thermal conditioning device of the battery device (if the battery device is the battery device having thermal management design of this invention, then the associated thermal conditioning device will be the flow channel device, the same hereinafter), such that the system fluid can be circulated between the battery device and the system fluid circulation device.

According to an embodiment of the present invention, the system fluid circulation device of the battery system further comprises a system fluid temperature control device for heating and/or cooling the system fluid, wherein the system fluid temperature control device can be embodied as a temperature control device, such as a heat pump and etc..

According to an embodiment of the present invention, the system fluid temperature control device of the battery system having thermal management design can further be integrated, combined, coupled, or connected with other device(s), such as vehicle air-conditioning system, relative electrical devices like vehicle radiator, AC-DC converter, DC-AC inventor, motor in the electric vehicle related field, and etc., for assisting cooling and heating of the system fluid, so as to enhance the energy efficiency of the system fluid temperature control device.

According to an embodiment of the present invention, the system fluid temperature control device of the battery system having thermal management design can further equipped with a temperature control middle layer disposed between the system fluid temperature control device and the system fluid pipe. The temperature control middle layer comprises a fluid and a fluid extraction and storage device. Such design and arrangement is mainly to allow the temperature control middle layer to be filled by the fluid for being a heat exchange medium between the system fluid pipe and the system fluid temperature control device when the battery system, such as an electric vehicle lithium battery system is operating in a mild, and suitable environmental temperature window, such as 15-35° C. Nevertheless, if the environment is harsh with extremely high or low temperature or the electric vehicle is parked for long time, in order to avoid the impact to the battery device through the path of the system fluid pipe and the system fluid temperature control device, the fluid can be removed from the temperature control middle layer.

According to an embodiment of the present invention, the system fluid circulation device of the battery system having thermal management design further comprises a system fluid storage device for pre-storing the conditioned system fluid According to an embodiment of the present invention, the system fluid circulation device of the battery system having thermal management design further comprises a system fluid delivery device, which can be embodied as a pump and etc., so as to actively circulate the system fluid in and between the system fluid circulation device and the battery device, so as for conducting heat exchange with the battery device.

According to an embodiment of the present invention, if the battery device of the battery system having thermal management design has a plurality of battery modules, the heat exchange associated devices for the respective battery modules can be connected in series, parallel, or proper combinations of both, so as to allow the system fluid to be circulated in a plurality of the heat exchange associated devices.

According to an embodiment of the present invention, the system fluid pipe of the system fluid circulation device of the battery system having thermal management design can further comprise a branch pipe connected therewith and extended to be of direct or indirect contact with the positive and negative terminal electrical cable wires of the battery device, so as to allow the system fluid to exchange heat with the positive and negative terminals electrical cable wires through the branch pipe and avoid the impact of environmental temperature outside the enclosure to the battery module arranged in the battery device through the positive and negative terminals electrical cable wires.

According to an embodiment of the present invention, the system fluid of the battery system having thermal management design can be composed by fluid(s) in liquid state, gas state, or gas-liquid two-phase, wherein liquid state fluid may be refrigerant, dimethyl ether, pure water, water-glycol, water-propylene glycol, or other liquid state fluid that does not react with the system fluid circulation device and the battery device; wherein gas state fluid may be water vapor, air, or other gas state fluid that does not react with the system fluid circulation device and the battery device; wherein gas-liquid two-phase fluid may be water and water vapor, acetone and acetone vapor, or other two-phase fluid that does not react with the system fluid circulation device and the battery device.

According to an embodiment of the present invention, the system fluid of the battery system having thermal management design can also be a solid-liquid suspension fluid, which utilizes the high thermal capacity and high thermal conductive solid particles, such as silicon carbide (SiC), aluminum oxide (Al2O3), and etc., suspended in the liquid state fluid to form an uniformly, well mixed suspension fluid of larger heat capacity and fast heat exchange characteristic during heat exchange process between the system fluid and the battery module.

According to an embodiment of the present invention, the system fluid, the system fluid pipe of the system fluid circulation device, and the heat exchange associated devices of the battery device (the flow channel device of the battery device having thermal management design of this invention) may be further integrated as a heat pipe, labelled as the system heat pipe. Alternatively, the said system heat pipe is able to be replaced by the dual-heat-pipe combination, which the system fluid and the system fluid pipe may be integrated as a system fluid heat pipe, and the system fluid and the heat exchange associated devices of the battery device (the flow channel device of the battery device having thermal management design of this invention) can be integrated as the other heat pipe labelled as a flow channel heat pipe. The dual-heat-pipe combination is able to be operated via heat transfer through one end or part of the system fluid heat pipe is able to be of direct or indirect contact with one end or part of the flow channel heat pipe. Through the gas-to-liquid and liquid-to-gas transitions of the system liquid, the two-phase system fluid is able to release and receive heat respectively at two different ends of the single system heat pipe or the dual-heat-pipe combination of the system fluid heat pipe and the flow channel heat pipe at the two different ends. The above mechanism is able to greatly improve the heat conduction and transmission rate. Here, an end or part of the surface of the outer tube of the single heat pipe or the dual-heat-pipe combination can be of direct or indirect contact with the system fluid temperature control device for thermal conditioning. Subsequently the other end or the other part of the surface of the outer tube can be of direct or indirect contact with the battery module of the battery device for heat exchange. In this case, the system fluid delivery device and the system fluid storage device could then be omitted thanks to passive acting feature of the heat pipe- In order to achieve the above and other objects, the present invention also provides a battery device having thermal management design, which comprises a battery module, an enclosure, a set of positive and negative terminal electrical cable wires, and a flow channel device. The flow channel device comprises the system fluid disposed and provided therein, such that, by means of connecting, coupling, and engaging the flow channel device and the battery module, the system fluid can be of direct or indirect contact with the battery module for heat exchange. The enclosure comprises a thermal insulation unit, a structural unit, and a channel. The thermal insulation unit shows excellent thermal insulation capability. With the aid of the enclosure, the impact of the environmental temperature to the battery module of the battery device is effectively avoided. The structural unit is coupled with the thermal insulation unit to form a complete enclosure with substantial mechanical strength. The channel connects and communicates the inner space of the battery device confined by the enclosure and the associated outer space, so as to provide and act as a path for the positive and negative terminal electrical cable wires, signal transmission line, and system fluid of the battery device to communicate in between, which is to conduct charge and discharge, signal transmission, and system fluid circulation of the battery device with the associated devices outside the confined space by the enclosure. Besides, the flow channel device of the battery device having thermal management design of this invention and the system fluid disposed therein may be further integrated as the flow channel heat pipe. The surface of the outer tube of an end or part of the flow channel heat pipe can proceed heat exchange with the associated temperature control medium of the battery system, while the surface of the outer tube of the other end or the other part can conduct heat exchange and temperature control through direct or indirect contact with the battery module(s).

According to an embodiment of the present invention, the quantity of the channel provided in the battery device having thermal management design can be single or multiple based on the demands, wherein the channel(s) is(are) arranged at the proper position of the enclosure, so as to overcome the spatial and functional limitations. For example, the set of positive and negative terminal electrical cable wires and the signal transmission line are located in two different channels so as to avoid possible signal interference.

According to an embodiment of the present invention, the channel of the battery device having thermal management design can further comprises a thermal insulation sealing layer arranged thereon and at least filling out the left space in the channel, so as to reduce the impact of the environmental temperature outside the enclosure to the battery module accommodated in the enclosure.

According to an embodiment of the present invention, the quantities of the thermal insulation unit and the structural unit of the enclosure of the battery device having thermal management design can respectively be single or multiple, so as to form a complete enclosure to isolate, or reduce the impact of the environmental temperature to the battery device internally.

According to an embodiment of the present invention, the structural unit of the enclosure of the battery device having thermal management design can further comprise a stratiform structural unit, a bracket structural unit, or combinations thereof integrating, connecting or coupling with the thermal insulation unit to form an enclosure with substantial mechanical strength to isolate or reduce the impact of the environmental temperature to the battery device internally. In case the environmental heat or cold source is isotropic, the enclosure of the battery device needs to be fully composed of thermal insulation units. On the other hand, if the environmental heat or cold source is anisotropic, part of the enclosure of the battery device for less or no impact from the associated heat/cold source is able to build without the thermal insulation unit. In another word, part of the enclosure is able to build without thermal insulation units.

According to an embodiment of the present invention, the materials of the structural unit of the enclosure of the battery device having thermal management design include composite metallic material, such as titanium alloy, aluminum alloy, stainless steel, and etc., fiber reinforced plastics, glass fiber composite plastics, carbon fiber composite plastics, engineering plastics, or the combinations thereof.

According to an embodiment of the present invention, the materials of the structural unit of the enclosure of the battery device having thermal management design usually shows higher thermal conductivity than that of the thermal insulation unit. In case the structural unit of the enclosure extended from outer enclosure surface to the inner one confined by the enclosure itself to form a good thermal conduction path, the thermal insulation unit can be further covered on the inner surface of the enclosure to terminate the exposure of the structural unit, so as to terminate the good thermal conduction path crossing the inner and outer space.

According to an embodiment of the present invention, the thermal insulation unit of the enclosure of the battery device having thermal management design can be a sealing layer of a confined space. The associated confined space is vacuum therein, so as to isolate or reduce the impact of the environmental temperature to the battery module(s). The vacuum pressure of the associated confined space is usually lower than 0.01 Pa, and in a better condition, lower than 0.001 Pa. The vacuum pressure of the associated confined space of sealing layer can be controlled during manufacturing process. Alternatively, it may provide a seal perforation on the enclosure, wherein an end of the seal perforation is able to be communicated to the associated confined space of the sealing layer, while the other end thereof is connected to one end of a valve joint outside the enclosure. The other end of the valve joint is adapted to be connected with a vacuum apparatus, so as for measuring and controlling the vacuum state of the sealing layer when needed. For example, the pressure gauge indicates that the sealing layer has reached the minimum vacuum pressure requirement (e.g. 0.001 Pa) or the vacuum pressure can be maintain during the regular examination and maintenance of the battery device. The vacuum apparatus can be a vacuum pump or other suction device, which may be an external device or part of the battery device. Besides, the sealing layer may further comprise a metal layer, such as an aluminum foil or copper foil covered thereon, deposit metal layer disposed thereon through other metal deposit process, and etc., so as to prevent heat dissipation due to radiation.

According to an embodiment of the present invention, the thermal insulation unit of the enclosure of the battery device having thermal management design can be made of a thermal insulation material, which includes but not limited to foam materials (such as Polyurethane related materials, Polystyrene related materials, and etc.), silicon dioxide related materials (such as glass fibers, fumed silica, and etc.), aerogel, pearlite, glass wool, ceramic wool, vacuum insulation plate, or combinations of the above materials.

According to an embodiment of the present invention, the thermal insulation unit of the enclosure of the battery device having thermal management design can be a combination of what mentioned above, which indicates the thermal insulation material in the confined space of the sealing layer under vacuum pressure lower than or equal to 0.01 Pa. The thermal insulation material includes but not limited to foam materials (such as Polyurethane related materials, Polystyrene related materials, and etc.), silicon dioxide related materials (such as glass fibers, fumed silica, and etc.), aerogel, pearlite, glass wool, ceramic wool, vacuum insulation plate, or combinations of the above materials.

According to an embodiment of the present invention, the battery device having thermal management design further comprises a battery management system (BMS) arranged thereon for sensing the voltage and temperature of the battery cells or battery module disposed in the battery device, communicating with a master control device of the battery system through a signal transmission line or other proper wireless means (e.g. WIFI and etc.), and conducting proper control activities.

According to an embodiment of the present invention, the pipes, wires and power cables, such as the pipeline for the system fluid transportation, the signal transmission line, and the positive and negative terminals electrical cable wires, disposed in the channel of the battery device having thermal management design for communicating the inside and outside of the enclosure further comprises a thermal insulation sleeve arranged, disposed, or sleeved on the surface thereof, so as to reduce the impact of the environmental temperature to the battery device accommodated in the enclosure.

According to an embodiment of the present invention, beyond the thermal solution of the battery device having thermal management design and/or the battery system having thermal management design, the battery cells also needs a mechanism for fast and high energy efficient heat exchange to the external environment of the battery device, so as to avoid heat generated during the battery device operation from accumulation or to conduct fast heat up of the battery device exposed to a low temperature environment for a long time. Meanwhile, the temperature uniformity of all the battery cells has to be maintained during the heating or cooling process, which is to reduce the temperature differences among the battery cells as possible. If the requirements mentioned above can be satisfied, it can further enhance the overall performance and the service life as well as user friendliness of the battery system having thermal management design with the associated battery device having thermal management design or the battery device having thermal management design or the battery system having thermal management design.

In order to achieve the above and other objects, the present invention also provides a battery module having thermal management design. The battery module comprises a secondary battery cell and a heat exchangeable battery cell charging and discharging circuit as the main components thereof. The heat exchangeable battery cell charging and discharging circuit comprises a heat exchange pipe, which serves not only as part of the charging and discharging circuit for the battery cells, but also a heat exchanger to remove the generated heat during the operation of single/multiple battery cells that are directly or indirectly connected with the heat exchange pipe and the resistance heat generated by the charging and discharging circuit from the battery module.

In addition, when the temperature of the battery cells needs to be conditioned in advance, for example, the environmental temperature is beyond the preferred temperature window of battery cells, the battery cells needs to be heat up or cool down in advance so as to reach a temperature which is safe for rapid charging process, the heat exchange pipe is able to serve not only as a bridge for the fast and high energy efficient thermal conditioning for the battery cells, but the tool better temperature uniformity among the battery cells connected therewith.

According to an embodiment of the present invention, the heat exchange pipe of the battery module having thermal management design comprises an outer tube, a confined space, and a fluid entitled as heat exchange pipe fluid disposed and provided in the confined space, wherein the outer tube of the heat exchange pipe can be made of a conducting material, wherein the heat exchange pipe fluid disposed in the confined space of the heat exchange pipe is the major heat transmission medium. The heat exchange pipe exhibits thermal conductivity which is much better than that of conventional materials, such as copper, and aluminum the metallic materials, such that a plurality of the battery cells can rely on the heat exchange pipe(s) connected, engaged, and coupled with the positive, negative, or both electrodes thereof for better temperature uniformity therebetween and to control the temperature thereof in a fast and high energy efficient manner.

According to an embodiment of the present invention, the heat exchange pipe of the heat exchangeable battery cell charging and discharging circuit of the battery module having thermal management design is directly or indirectly connected and engaged with at least one of the electrodes of the battery cells. Since the heat exchange pipe is also part of the battery cell charging and discharging circuit, the connection or engagement between the heat exchange pipe and the battery cells follows the design rule of charging and discharging circuit. For example, if the battery cells are connected in parallel to form a parallel set and both positive and negative electrodes thereof have the heat exchange pipes for the charging and discharging circuit, then all the positive electrode of the battery cells will be connected to the same heat exchange pipe(s) (can be single or multiple), while all the negative electrode of the battery cells will be connected to the other heat exchange pipe(s) (can be single or multiple). Besides, these two groups of the heat exchange pipes have to be electrically insulated. Other design rule that may apply would not be given, please refer to related public knowledge.

According to an embodiment of the present invention, the heat exchangeable battery cell charging and discharging circuit of the battery module having thermal management design brings the benefits of utilizing the heat exchange pipe as both a heat exchange medium and part of the charging and discharging circuit of the battery cells since the jelly rolls of the internal positive and negative electrodes of the battery cells are respectively directly connected with the metal tabs of the positive and negative electrodes, which the number of the associated metal tabs for the respective positive and negative electrodes of the battery cells is at least one, and the metal foils of both the jelly rolls and the associated metal tabs are made of high thermal conductivity metallic material, such as copper, and aluminum. Since the above materials exhibits low thermal resistance, the utilization of the heat exchange pipe(s) in the charging and discharging circuit can directly, effectively, and rapidly process heat exchange with the interior of the battery cells.

According to an embodiment of the present invention, for a battery cell charging and discharging circuit of the battery module having thermal management design, the positive and the negative electrodes of the battery cell are respectively connected, engaged, and coupled with different heat exchange pipes. Besides direct connection, the electrodes of the battery cell and the heat exchange pipes may also be connected, engaged, and coupled through proper metal structural elements, which enhances the convenience for the manufacturing process of the battery module. Accordingly, the battery cell(s) can conduct charging and discharging and heat exchanging through the metal structural element and the heat exchange pipe.

According to an embodiment of the present invention, at least part of the outer tube of the heat exchange pipe of the heat exchangeable battery cell charging and discharging circuit of the battery module having thermal management design be of direct or indirect contact with the temperature control medium outside the battery module having thermal management design (noted that if the battery module having thermal management design is part of the battery device having thermal management design, then the temperature control medium is the system fluid disposed in the flow channel device of the battery device, which will similarly apply hereinafter and will not be repetitively described). The interface where the heat exchange pipe contacts the temperature control medium as mentioned above is the module heat exchange interface, which allows the battery cells of the battery module to rapidly exchange heat through the heat exchange pipe and the temperature control medium and achieve the requirement of the temperature uniformity of a plurality of the battery cells of the same battery module. Moreover, if the temperature control medium can be circulated among the battery modules through the heat exchange associated device of the battery device, such as that the system fluid can be circulated among a plurality of the flow channel devices and the system fluid circulation devices in the battery device having thermal management design, it will further improve the uniformity of the temperature among different battery modules. All in all, the medium fluid temperature control device can control the temperature of the battery cells through the system fluid and the heat exchange pipe(s).

According to an embodiment of the present invention, for the heat exchangeable battery cell charging and discharging circuit of the battery module having thermal management design, if the battery module is part of the battery device having thermal management design of the battery system having thermal management design and the system fluid, the system fluid pipe, and the flow channel device are integrated to be system heat pipe, or the system fluid—the flow channel device and the system fluid—the system fluid pipe are respectively integrated to be the flow channel heat pipe and the system fluid heat pipe, the dual-heat pipe combination, which an end or part of the surface of the outer tube of the system heat pipe or the flow channel heat pipe and part of the surface of the outer tube of the heat exchange pipe of the battery module can be the module heat exchange interface. At least part of the above mentioned system heat pipe or flow channel heat pipe of the dual-heat pipe combination is able to have direct or indirect contact with heat exchange pipe. If there are a plurality of the heat exchange pipes which respectively belongs to different parallel sets of the battery module and the parallel sets are series connected in the battery module, then the heat exchange pipes are respectively corresponding to different voltages of the series connections. Here, the heat exchange pipes at the module heat exchange interface are electrical insulated to one another. If there is no voltage difference among some of the heat exchange pipes, the electrical insulation arrangement will be optional.

According to an embodiment of the present invention, as for the heat exchangeable battery cell charging and discharging circuit of the battery system having thermal management design, the metal structural element and the metal outer tube of the heat exchange pipe are engaged, connected, and coupled through one or multiple kinds of the welding, soldering, and bonding techniques, such as ultrasonic bonding, resistance spot welding, laser welding, and etc..

According to an embodiment of the present invention, as for the heat exchangeable battery cell charging and discharging circuit of the battery module having thermal management design, the metal structural element and the battery cell(s) are engaged and connected through one or multiple kinds of the bonding techniques, such as ultrasonic bonding, resistance spot welding, laser welding, and etc..

According to an embodiment of the present invention, as for the heat exchangeable battery cell charging and discharging circuit of the battery module having thermal management design, the integration between the outer tube of the heat exchange pipe and the metal structural element may also be conducted through a middle layer, made of material such as tin, tin alloy, and etc..

According to an embodiment of the present invention, as for the heat exchangeable battery cell charging and discharging circuit of the battery module having thermal management design, the surface of the joint of the integration between the outer tube of the heat exchange pipe and the metal structural element may further be coated, so as to reinforce the connection among the middle layer, the outer tube of the heat exchange pipe, and the metal structural element.

According to an embodiment of the present invention, as for the heat exchangeable battery cell charging and discharging circuit of the battery module having thermal management design, the coating on the surface of the joint of the integration between the outer tube of the heat exchange pipe and the metal structural element may be a nickel or nickel alloy coating.

According to an embodiment of the present invention, a parallel set may comprise one or a plurality of battery cells in the battery module having thermal management design. The cells in the parallel set are connected in parallel through the heat exchange pipe and the metal structural element. In some cases, both the positive and negative electrodes of the parallel set have the metal structural element-heat exchange pipe for parallel connection, such that it is a parallel set with both positive and negative electrodes having the metal structural element-heat exchange pipe for parallel connection. In another cases, only one of the both electrodes thereof has the metal structural element-heat exchange pipe for parallel connection, while the other electrode has only the metal structural element for parallel connection. Usually, the former design is more suitable for high power applications, while the latter one is suitable for mid and low power applications.

According to an embodiment of the present invention, the quantity of the parallel set of the battery module having thermal management design can be multiple and the parallel sets are connected one by one in series. It is that the negative electrode of the parallel set of the lowest voltage in the series in the module is the negative electrode of the module; and the positive electrode of that parallel set of the lowest voltage is connected to the negative electrode of the parallel set of the second lowest voltage in the series in the module, and so on. Then, the positive electrode of the parallel set of the highest voltage is the positive electrode of the module. Besides, the series connection among these parallel sets can also be conducted through suitable the metal structural element-heat exchange pipe as the series connection medium.

According to an embodiment of the present invention, for the battery module having thermal management design, if there are a plurality of the parallel sets of the battery module being partially or fully series connected, the system fluid can be high insulation fluid, such as pure water, mineral oil, and etc., in order to reduce the risk of short circuit among a plurality of the heat exchange pipes for a plurality of the parallel sets in the module heat exchange interface.

According to an embodiment of the present invention, if the battery module having thermal management design is part of the battery device having thermal management design of the battery system having thermal management design; the system fluid, the system fluid pipe, and the flow channel device are integrated into the system heat pipe or the system fluid—the flow channel device and the system fluid—the system fluid pipe are respectively integrated to be the flow channel heat pipe and the system fluid heat pipe, a dual-heat pipe combination; and partial or entire parallel sets are in series connected, then the above mentioned system heat pipe (or the flow channel heat pipe for the dual-heat pipe combination) can further comprise a middle layer arranged between the system heat pipe (or the flow channel heat pipe) and the parallel sets in the module heat exchange interface. The middle layer can be high insulation fluid, such as pure water, mineral oil, and etc., or gas-liquid two-phase fluid, such as water-water vapor and etc., which exchanges heat by means of heat pipe-like manner, or high thermal conductive solid state electrical insulation layer, such as silicon carbide layer, aluminum oxide, aluminum nitride, compound materials that contain the above ceramic material, and etc., or combinations of the above fluid and solid state electrical insulation layer, in order to avoid the risk of short circuit among a plurality of the parallel sets with different voltages.

According to an embodiment of the present invention, if the battery module having thermal management design is part of the battery device having thermal management design of the battery system having thermal management design; and the system fluid, the system fluid pipe, and the flow channel device are integrated into the system heat pipe or the system fluid—the flow channel device and the system fluid—the system fluid pipe are respectively integrated to be the flow channel heat pipe and the system fluid heat pipe, a dual-heat pipe combination, as mentioned previously, then the heat exchange pipe at the module heat exchange interface between the battery module and the system heat pipe (or the flow channel heat pipe) can be part of the metal outer tube of the system heat pipe (or the flow channel heat pipe), so as to have the heat pipe two-phase system fluid to be direct contacted with the heat exchange pipe for high efficient heat exchange. Nonetheless, proper electrical insulation is required between the heat exchange pipe and the metal outer tube of the above mentioned system heat pipe or flow channel heat pipe, so as to avoid the risk of short circuit among a plurality of the parallel sets with different voltages.

According to an embodiment of the present invention, the quantity of the battery module having thermal management design being disposed in the battery device can be single or multiple, wherein if it is the case of multiple, the battery modules can be properly connected in parallel, in series, or both with the positive and negative electrodes terminals thereof.

According to an embodiment of the present invention, the heat exchange pipe of the heat exchangeable battery cell charging and discharging circuit of the battery module having thermal management design can be a heat pipe, entitled as a module heat pipe, such that the metal outer tube thereof and the metal structural element can be utilized as the charging and discharging circuit or path of the battery cells and the metal outer tube thereof can also serve as a medium for the heat exchange of the battery cells. The two-phase heat exchange pipe fluid in the module heat pipe will respectively conduct gas-liquid and liquid-gas phase changes in the two closed ends or two parts of the module heat pipe, so as to respectively release or receive heat to allow the module heat pipe to rapidly pass, transmit, and deliver the heat between the two ends or the two parts thereof.

According to an embodiment of the present invention, the key materials of the outer tube of the module heat pipe and the metal structural element of the battery module having thermal management design are high thermal conductive metallic material, such as copper, aluminum, compound materials, and etc., wherein the heat exchange pipe fluid provided in the module heat pipe is a gas-liquid two-phase fluid, such as water-water vapor, acetone and acetone vapor, and other gas-liquid two-phase fluids that does not react with the pipe wall of the module heat pipe.

According to an embodiment of the present invention, if the battery module having thermal management design is part of the battery device having thermal management design of a battery system having thermal management design; the battery system comprises the system heat pipe (or the dual-heat pipe combination that contains both the system fluid heat pipe and the flow channel heat pipe); the system heat pipe or the flow channel heat pipe is further matched, coupled, and arranged with the middle layer as mentioned previously; and the module heat pipe as mentioned previously serves as a fast heat transmission path between the battery cells and the system fluid temperature control device, then it can avoid the fluid leakage issues of common liquid cooling temperature control systems and be featured in light weight and fast heat transmission, so as to satisfy the demands for fast and high energy efficient temperature control and temperature uniformity for a plurality of the battery cells of a plurality of the battery modules.

According to an embodiment of the present invention, for the battery module having thermal management design, the battery device having thermal management design, and the battery system having thermal management design, the battery cell is defined as an electrochemical cell at least having a positive electrode, a negative electrode, and an electrolyte without being limited in particular forms, including common cylindrical cell, pouch cell, prismatic cell, and etc.. Besides, the type of the electrochemical secondary battery cell of the battery cell is not limited as well, but includes battery cells of lead acid battery, nickel-metal hydride battery, lithium ion battery, and other secondary battery. Also, the performance, service life, and security of the secondary battery are related to the range of its operating temperature.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIGS. 1a to 1h and FIGS. 1i-(1) to 1i-(5) are perspective views of the battery device having thermal management design and part of the battery system according to various alternative modes of a first embodiment of the present invention illustrating part of the thermal insulation design of the enclosure.

DETAILED DESCRIPTION OF THE PREFERRED EMBODIMENT

Figure 1A:
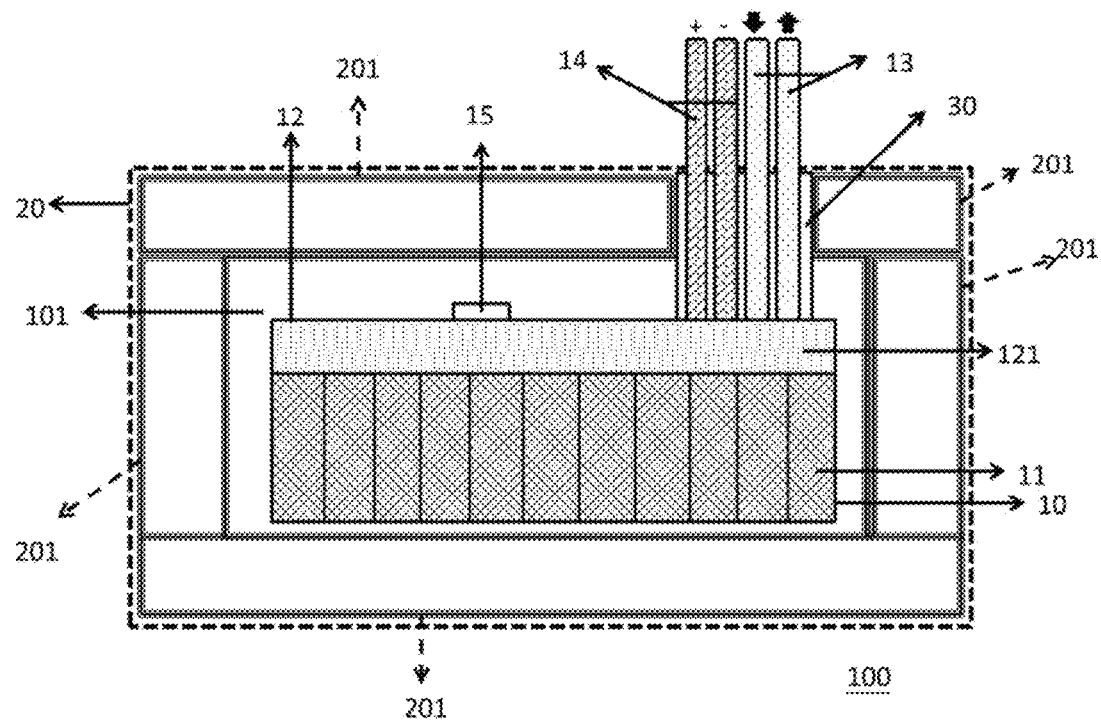

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

In order to highlight the key points of the present invention, the signal lines are all omitted from FIGS. 1a-4g. Besides, the system fluid 121 mentioned below for the figures and relative descriptions is the above mentioned temperature control medium, and the system fluid 121 can be fluid(s) of liquid state, gas state, gas-liquid two-phase, solid-liquid two-phase, and combinations thereof, except when specifically indicated if any. The liquid state fluid can be such as refrigerant, dimethyl ether, pure water, water-glycol, water-propylene glycol, and other liquid state fluid that does not react with the system fluid circulation device, the battery module, and the battery device. The gas state fluid can be such as water vapor, air, and other gas state fluid that does not react with the system fluid circulation device, the battery module, and the battery device. The gas-liquid two-phase fluid can be such as water and water vapor, acetone and acetone vapor, and other gas-liquid two-phase fluid that does not react with the system fluid circulation device, the battery module, and the battery device. The solid-liquid two-phase solid suspension fluid can be high thermal capacity and high thermal conductivity solid particles, such as electrical insulating silicon carbide (SiC), aluminum oxide (Al2O3), aluminum nitride (AlN), and etc. uniformly suspended in a liquid state fluid, such as pure water, mineral oil, other pressure resistant liquid, and etc.. Nonetheless, according to the spirit of the present invention, the system fluid 121 mentioned above shall not be limited by the above examples and types of the liquid state, gas state, gas-liquid two-phase, and solid-liquid two-phase fluids. Also, if it is not specified, the thermal insulation material layer mentioned below can be formed and composed by the following examples: polyurethane (PU) related materials, Polystyrene (PS) related materials, silicon dioxide related materials (such as glass fibers, fumed silica, and etc.), aerogel, pearlite, glass wool, ceramic wool, and combinations thereof. Nevertheless, according to the spirit of the present invention, the composition material of the thermal insulation material layer mentioned above shall not be limited by the above examples. For the sake of explanatory easiness, the enclosure and the rest of the elements (e.g. battery module, flow channel device, and etc.) of the battery device having thermal management design are described separately in the embodiments.

Besides of the enclosure, the rest of the elements of the battery device will still be called the battery device, while the enclosure 20 will be described independently. If it is necessary to refer to the original and entire battery device, it will utilize the term "battery device (10+20)" or the like.

FIG. 1s (that is, FIGS. 1a-1i) are perspective views of part of the battery system 100 and a battery device having thermal management design (labelled as "10" and "20" in the figures) mainly illustrating a thermal insulation design of the battery device 10 (does not include the enclosure) through the enclosure 20 according to the present invention. The design can avoid or reduce the impact of the environmental temperature outside the enclosure 20 to the battery module 11 and the battery cells (not shown in FIG. 1s) arranged in the battery module 11 of the battery device 10. Besides, it can also utilize the temperature-controlled system fluid 121 to highly efficiently control the temperature of the battery module 11 arranged in the battery device 10. According to the embodiment illustrated in FIG. 1s, the battery module 11 can be the battery module having thermal management design or a battery module with regular heat exchange pipe. Also, the figures only keep the system fluid pipe that is connected and engaged with the battery device, but omit the system fluid circulation device just for illustrating some of the ideas of the present invention, rather to limit the scope of the present invention.

FIG. 1a is a perspective view of part of the battery system 100 and battery device having thermal management design (labelled as "10" and "20" in the figures) according to a first embodiment of the present invention. It includes the battery device 10, formed by a plurality of the battery modules 11, the positive and negative terminals electrical cable wires 14, and the flow channel device 12; the system fluid pipe 13; and the enclosure 20 (as indicated by the dashed line), which has the sealing layer (201) for being a thermal insulation unit and the channel 30. The sealing layer (201) of the enclosure 20 is a confined space filled with gas, as indicated by the dotted arrow, for thermally insulating the battery device 10. The channel 30 communicates the space covered in the enclosure 20, which accommodates the battery module 11 and the flow channel device 12, with the outside of the enclosure 20. The system fluid pipe 13 and the positive and negative terminals electrical cable wires 14 are disposed and arranged in the channel 30. The system fluid pipe 13 disposed and arranged in the channel 30 is further connected with the flow channel device 12 of the battery device 10, so as for providing, distributing, and transporting the system fluid 121 from the outside of the enclosure 20 to the battery device 10 for conducting heat exchange with the battery module 11.

Figure 1B:
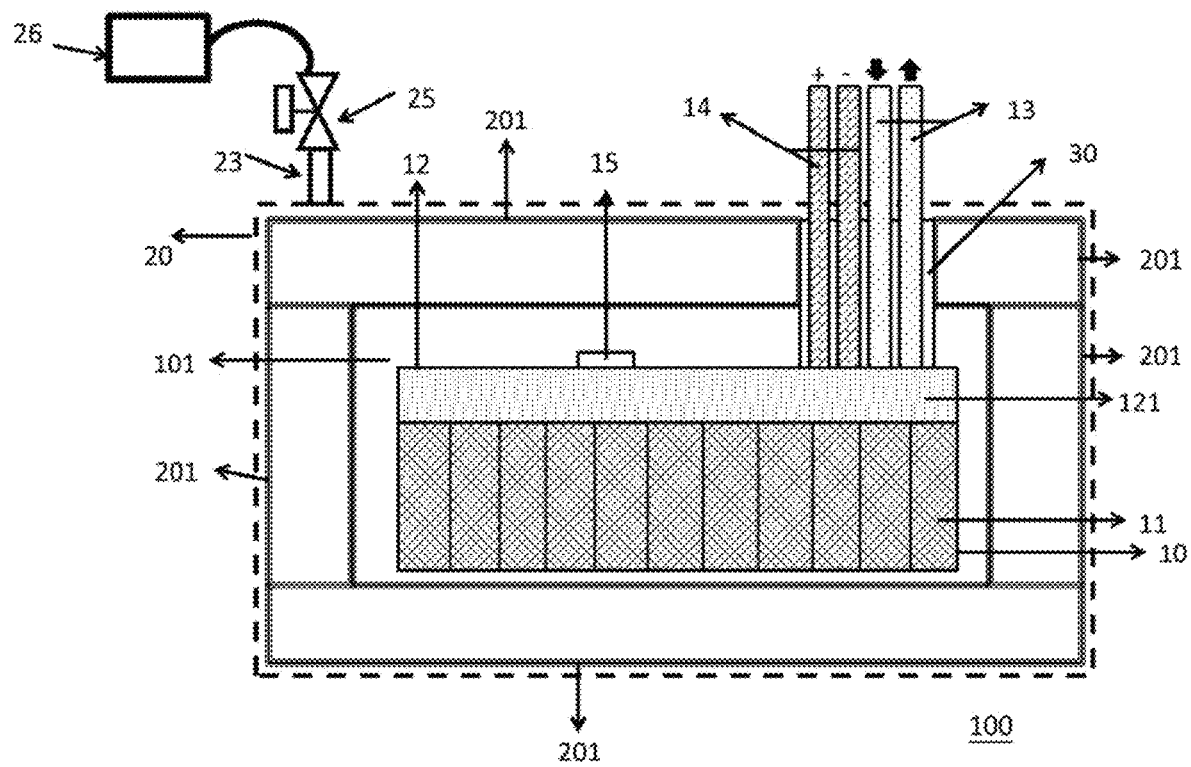

According to the above embodiment, FIG. 1b is a perspective view illustrating a battery device having thermal management design (10+20) and part of the battery system 100. The enclosure 20 (as indicated by the dashed line) additionally has a seal perforation 23. The inner space of the sealing layer 201 is connected with an end of the seal perforation 23, while the other end of the seal perforation 23 is connected with a valve joint 25 and a vacuum apparatus 26 located outside of the enclosure 20. When the external environment of the battery device 10 is mild, the inner space of the sealing layer 201 can stay full of gas. Nonetheless, if the temperature of the external environment of the battery device 10 is too high or too low, such as under 5 degrees Celsius or above 40 degrees Celsius, then one may utilize the vacuum apparatus 26 and the valve joint 25 outside of the enclosure 20 to vacuum the sealing layer 201 and make a proper vacuum confined space with a vacuum pressure of 0.01 Pa generally, and in 0.001 Pa in some condition. As the vacuum environment is created, one may turn off the vacuum apparatus 26 and the valve joint 25. Then the enclosure will have a suitable vacuum sealing layer 201 to achieve a high thermal insulation result. The sealing layer 201 of the enclosure 20 can maintain its proper vacuum state in any thermal environment, which enhances the simplicity of the system control. The vacuum apparatus 26 mentioned above is a vacuum pump or other suction device, which is not necessarily affixed on the battery device 10.

Figure 1C:
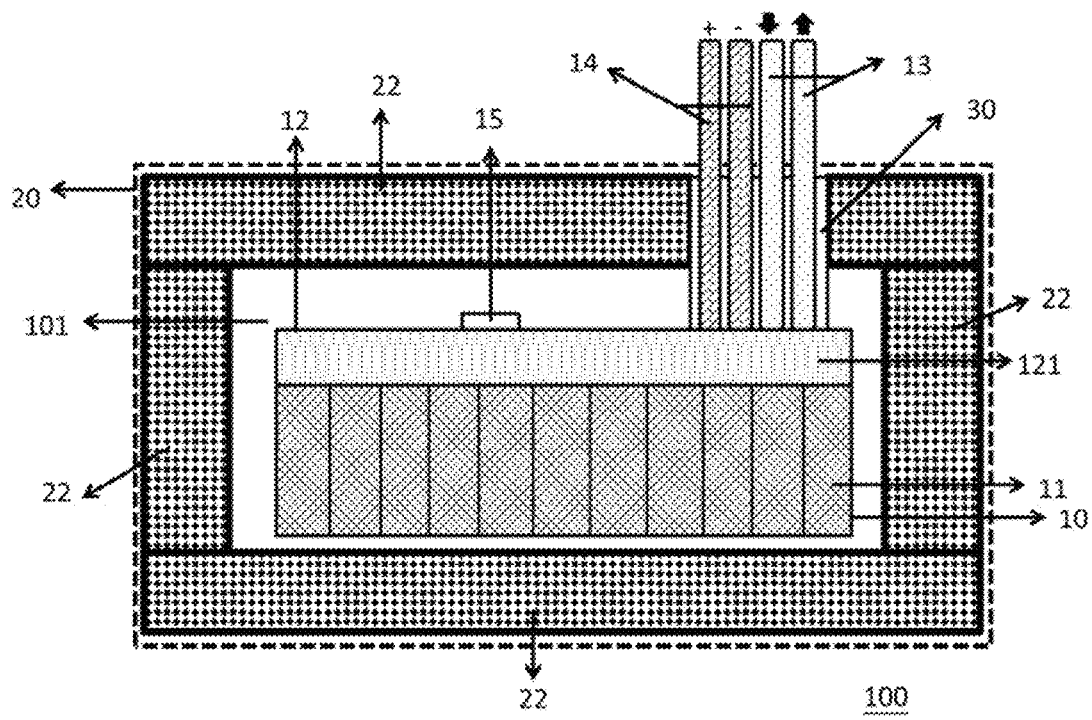

FIG. 1c is a perspective view of part of the battery system 100 and battery device having thermal management design (labelled as "10" and "20" in the figure) according to an embodiment of the present invention. It includes the battery device 10, formed by a plurality of the battery modules 11, the positive and negative terminals electrical cable wires 14, and the flow channel device 12; the system fluid pipe 13; and the enclosure 20, which has a thermal insulation unit and the channel 30. The thermal insulation unit of the enclosure 20 is formed of and made by a first thermal insulation material 22, for thermally insulating and sealing, packaging, and enclosing the battery device 10. The channel 30 communicates the space 101 covered in the enclosure 20, which accommodates the battery module and the flow channel device, with the outside of the enclosure 20. The system fluid pipe 13 and the positive and negative terminals electrical cable wires 14 are disposed and arranged in the channel 30. The system fluid pipe 13 disposed and arranged in the channel 30 is further connected with the flow channel device of the battery device 10, so as for providing, distributing, and transporting the system fluid 121 from the outside of the enclosure 20 to the battery device 10 and forming a circulation route for conducting heat exchange with the battery module 11.

Figure 1D:
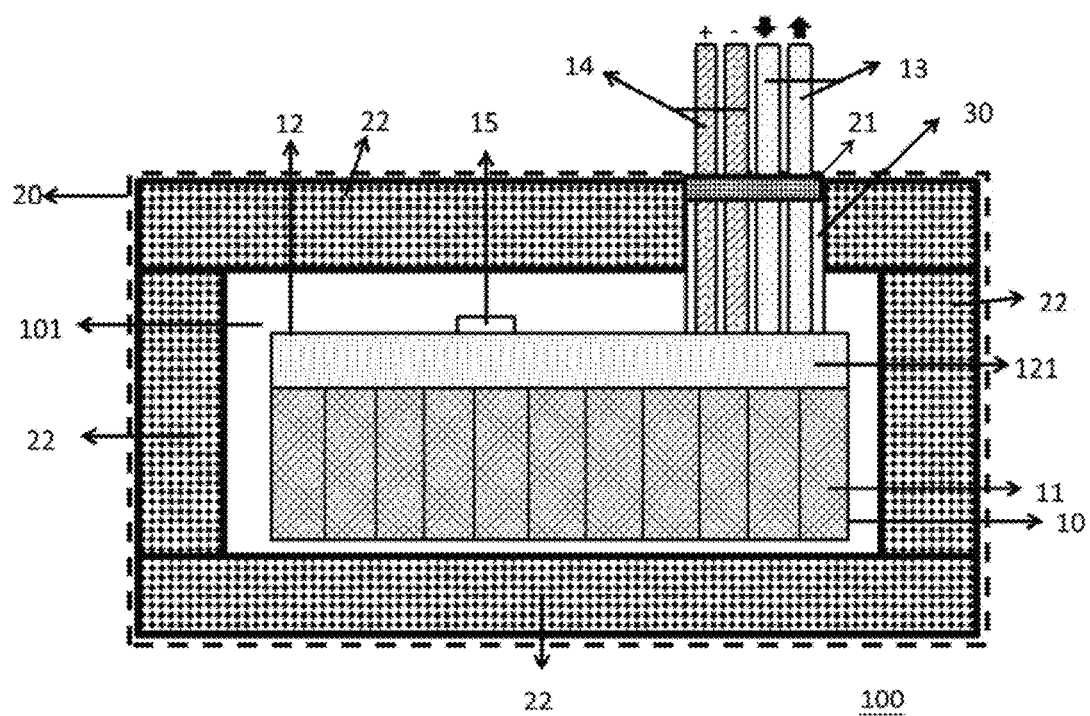

FIG. 1d illustrated a battery device having thermal management design (including "10" and "20" in the figure) and part of the battery system 100 according to an alternative mode to the above first embodiment illustrated in FIG. 1c, wherein the channel 30 arranged in the enclosure 20 further comprises a thermal insulation sealing layer 21 arranged thereon to further avoid or reduce the impact of the environmental temperature outside the enclosure 20 to temperature of the battery cells and the battery module 11 of the battery device 10 in the enclosure 20 through the inner space of the channel 30.

Figure 1E:
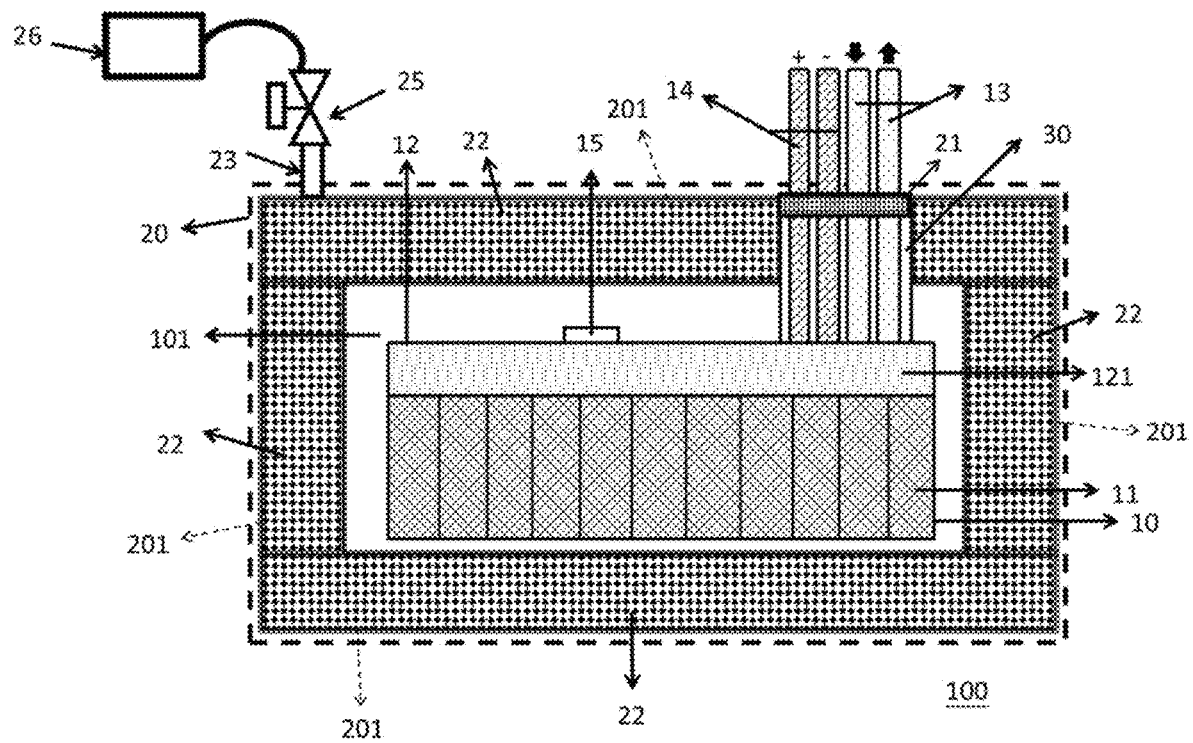

Referring to FIG. 1e, a battery device having thermal management design (including "10" and "20" in the figure) and part of a battery system 100 according to an alternative mode to the above second embodiment as FIG. 1d illustrated, wherein the enclosure 20 further comprises a seal perforation 23 arranged thereon, and the thermal insulation unit includes a sealing layer 201 filled by the first thermal insulation material 22 (as the scope indicated by the dotted arrow), wherein the sealing layer 201 is connected with the seal perforation 23. In other word, the first thermal insulation material 22 does not completely fill out the sealing layer 201, so it may regulate the air pressure of the residual space in the sealing layer 201 through the seal perforation 23. Also, the seal perforation 23 and the valve joint 25 are connected to a vacuum apparatus 26 in the manner mentioned above and in FIG. 1b, which would complete be repeated here.

Referring to FIG. 1e, a battery device having thermal management design (including "10" and "20" in the figure) and part of a battery system 100 according to an alternative mode to the above second embodiment, wherein the first thermal insulation material 22 provided in the sealing layer 201 is a porous thermal insulation material layer, which can be a porous structural layer mainly formed of silicon dioxide, PU, other low thermal conductivity materials.

Referring to FIG. 1e, a battery device having thermal management design (including "10" and "20" in the figure) and part of a battery system 100 according to an alternative mode to the above second embodiment, wherein the space in the sealing layer except for the porous space occupies by the first thermal insulation material 22 is vacuum, which vacuum pressure thereof is usually lower than 0.01 Pa. Nonetheless, it can still, based on the needs, lower the vacuum pressure to 0.001 Pa or lower.

Referring to FIG. 1e, a battery device having thermal management design (including "10" and "20" in the figure) and part of a battery system 100 according to the above second embodiment, wherein the thermal insulation unit formed and constructed by the sealing layer and the thermal insulation material can be embodied as a vacuum insulation plate (VIP). The main inner material of the VIP is porous thermal insulation material layer, which is a porous structure layer mainly formed by silicon dioxide or other low heat conductivity material like PU and etc.. The internal porous space being covered and enclosed by aluminum foil and vacuum sealed is usually vacuum with the pressure lower than 0.001 Pa in most cases, so as to achieve the functions of low thermal radiation, low heat conduction, and low heat convection.

Figure 1F:
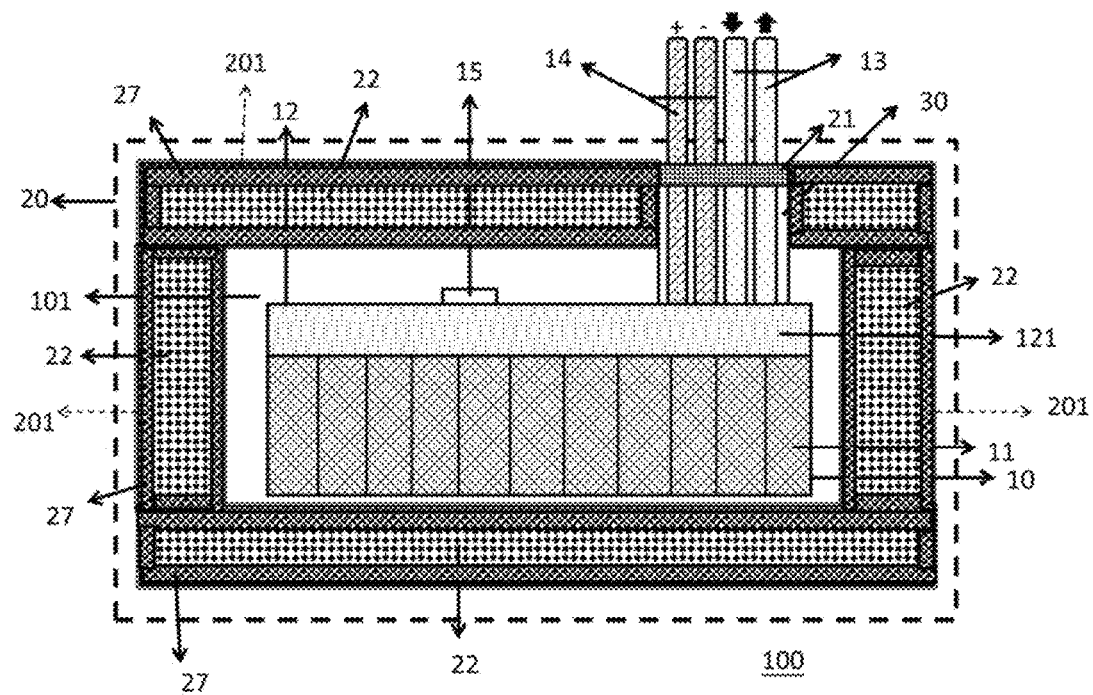

FIG. 1f illustrates a battery device having thermal management design (including "10" and "20" in the figures) and part of a battery system 100 according to an alternative mode to the above first embodiment as illustrated in FIG. 1e, wherein for the enclosure 20, when the thermal insulation unit is VIP or has the sealing layer 201 of the first thermal insulation material 22 (as indicated by the dotted arrow) and having a metal foil (e.g. aluminum foil) covering on the surface thereof, then another heat transmission path is the path allowing heat to be transmitted through the continuous surface of the metal foil. Therefore, it may apply, cover or coat a second thermal insulation material 27 onto the surface of the thermal insulation unit. The thermal conductivity of the second thermal insulation material 27 is lower than the metal foil and the second thermal insulation material 27 has good attachment or adhesiveness to the metal foil by means of its own characteristic or an adhesive.

Figure 1G:
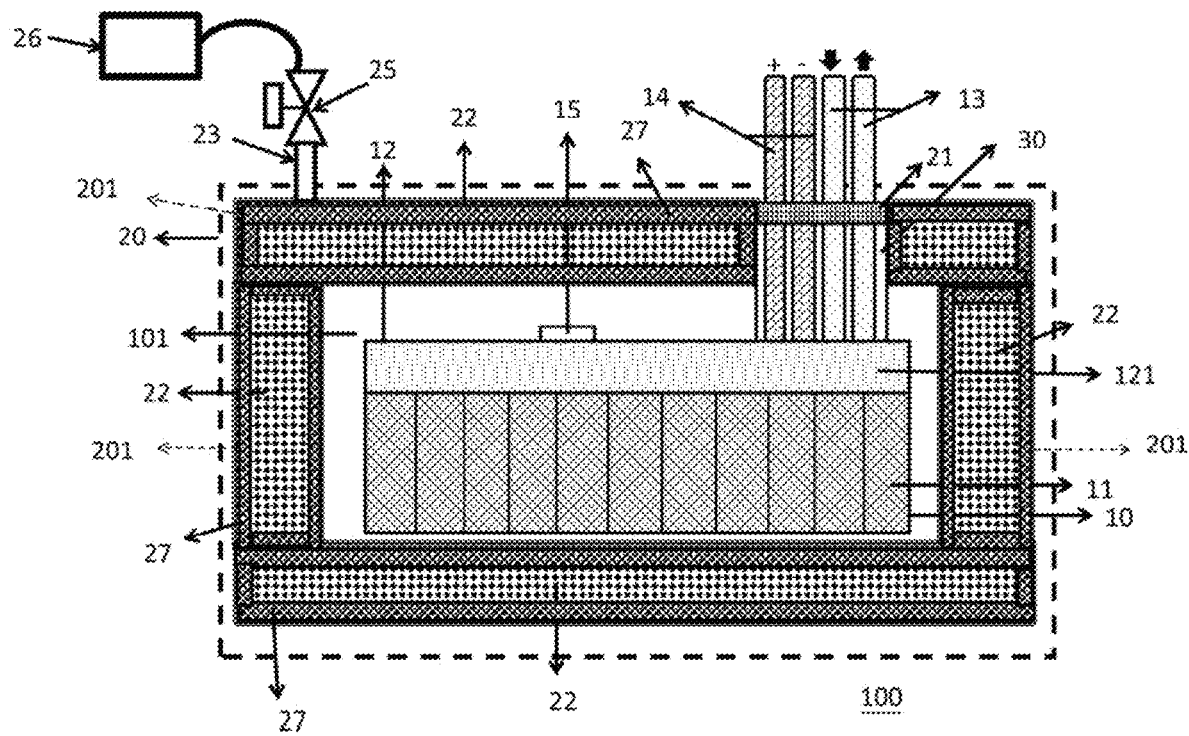

FIG. 1g illustrates a battery device having thermal management design (including "10" and "20" in the figures) and part of a battery system 100 according to an alternative mode to the above first embodiment as illustrated in FIG. 1f, wherein the enclosure 20 further comprises a seal perforation 23 arranged thereon. An end of the seal perforation 23 is connected with the inner space of the sealing layer 201. That is, when the thermal insulation unit is VIP or when the surface of the sealing layer 201 that has the first thermal insulation material 22 has a second thermal insulation material 27, there will be residual space in the sealing layer 201. Then the seal perforation 23 can be utilized to regulate the air pressure of the residual space in the sealing layer 201 through engaging the seal perforation 23, the valve joint 25, and the vacuum apparatus 26. Here, the arrangement, utilization modes, and functions of the seal perforation 23, the valve joint 25 and the vacuum apparatus 26 are mentioned above and in FIG. 1b, and would not be repeated.

Figure 1H:
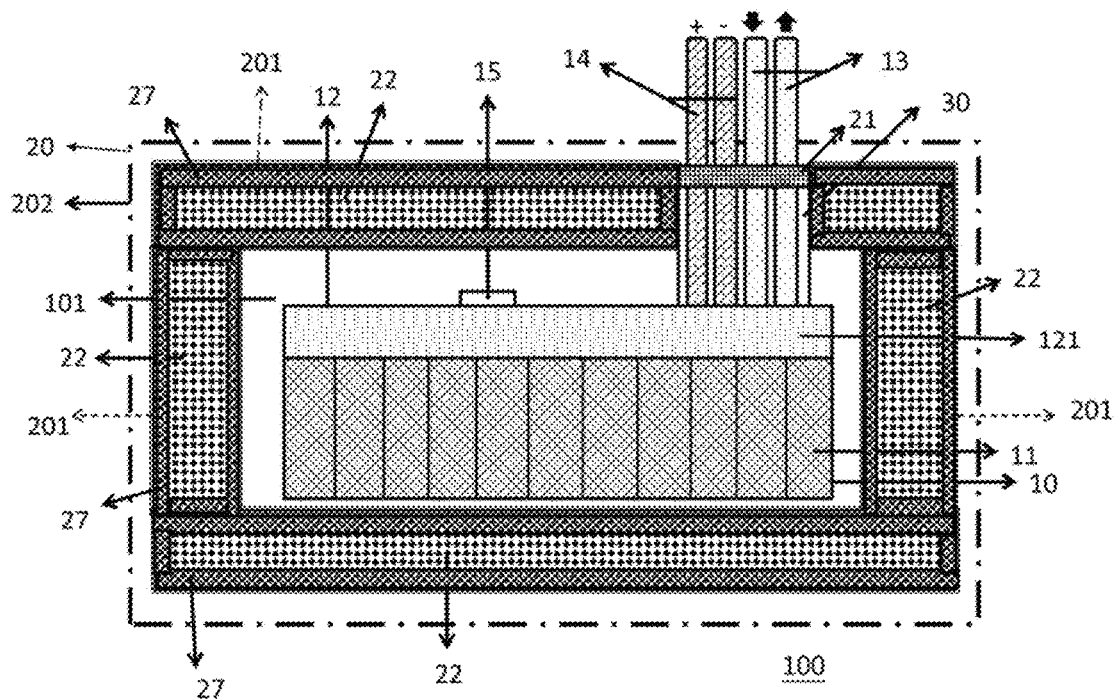

FIG. 1h illustrates a battery device having thermal management design (including "10" and "20" in the figures) and part of a battery system 100 according to an alternative mode to the above first embodiment as illustrated in FIG. 1f, wherein if the strength of the enclosure is not considered, the enclosure 20 can directly be the sealing layer 201 having the first thermal insulation material 22 or be formed only by single or multiple VIP as the thermal insulation unit thereof without the structural unit. Alternatively, it may also utilize the above mentioned simple stratiform structural unit 202 (referring to the area of the single dot-dotted arrow) to form and construct the enclosure 20 as illustrated in FIG. 1h. According to the present mode, it can utilize a continuous stratiform structural unit 202 to match with a plurality of the thermal insulation unit (having the sealing layer 201 of the first thermal insulation material 22) to form and construct the enclosure 20 or utilize non-continuous stratiform structural unit 202 to match with the thermal insulation unit.

Besides, the surface of the thermal insulation unit may further have the second thermal insulation material 27 covered, applied, and coated thereon based on the needs, as previously disclosed for FIG. 1f, which would not be repeated here.

FIG. 1i is a partial perspective view of a battery device having thermal management design (10+20) and part of a battery system 100, according to an alternative mode to any of the modes of the above first embodiment, as illustrated in FIGS. 1a-1h. If, based on the requirement of structural strength, the enclosure 20 may additionally have a bracket structural unit 203. If the bracket structural unit 203 added is disposed and arranged between the inside and outside of the enclosure and does not render any new good heat transmission path, as illustrated in FIG. 1i-(1), then no additional arrangement is required.

However, if the bracket structural unit 203 added creates a new good heat transmission path, as illustrated in FIG. 1i-(2) and FIG. 1i-(3), because the bracket structural unit 203 of the enclosure 20 creates and becomes a good heat transmission path between the inside and outside of the enclosure 20 and be capable of transmit heat to the stratiform structural unit 202 disposed in the inside (as the area indicated by the single dot-dotted arrow in the present embodiment) or the relative device of other battery device 10, it will allow heat of the outside of the enclosure 20 to simply be transmitted into the battery module 11. Therefore, it may utilize thermal insulation design and mechanism of the thermal insulation unit of the enclosure 20 arranged on the bracket structural unit 203 and the internal stratiform structural unit 202, as illustrated in any of FIGS. 1a-1h. Referring to FIG. 1i-(4), the thermal insulation unit 204 (as the area indicated by the thick dashed line) can be directly formed on the surface of the stratiform structural unit 202 (as the area indicated by the single dot-dotted arrow) in the enclosure 20 and the bracket structural unit 203, which is like the sealing layer 201, the first thermal insulation material 22 or the sealing layer 201 having the thermal insulation material. Alternatively, it may apply the idea illustrated in FIG. 1i-(5), which is to add the thermal insulation unit 204 (as the area indicated by the thick dashed line) on the bracket structural unit 203 and the strati form structural unit 202 in the enclosure 20. Here in the present embodiment, the thermal insulation design of the sealing layer 201, as illustrated in FIG. 1d, is utilized, so as to avoid the external thermal environment from affecting the battery cells and the battery module 11 in the battery device 10 due to the new heat transmission path created by the bracket structural unit 203 added.

FIG. 1a-1g are partial perspective views illustrating embodiments of a battery device having thermal management design (including "10" and "20" in the figures) and part of the battery system 100. The battery device 10 according to any of the embodiments further comprises a battery management system (BMS) 15 disposed therein. The battery management system 15 is capable of detecting the voltage and temperature of the battery module 11 in the battery device 10, communicating with a master control system outside of the battery system 100 through wireless communication or signal transmission line, and conducting proper control activities.

FIGS. 2s series are perspective views of a battery device having thermal management design (10+20) and part of the battery system 100 according to a second embodiment of the present invention. Similar to the above first embodiment, the above second embodiment mainly utilizes the thermal insulation design and arrangement of the enclosure 20 of the present invention to avoid the temperature outside of the enclosure 20 from influencing the battery cells and the battery module 11 of the battery device 10 arranged in the enclosure 20. Also, it can utilize the temperature-controlled system fluid 121 to highly efficiently control the temperature of the battery cells and the battery module 11 in the battery device 10. Nevertheless, a main difference between the above first embodiment and the above second embodiment is that. besides of the first thermal insulation material 22 and the second thermal insulation material 27, it adds a third thermal insulation material 24 to be the thermal insulation unit of the enclosure 20. The third thermal insulation material 24 covers and encloses the thermal insulation unit constructed and formed by the first thermal insulation material 22 and the second thermal insulation material 27 (if any) covered on the surface of the first thermal insulation material 22. The third thermal insulation material 24 can simply be a thermal insulation material or be provided in the sealing layer 201, which means that the sealing layer 201 having the third thermal insulation material 24 also has the first thermal insulation material 22 and the second thermal insulation material 27 (if any). Here the present embodiment will be illustrated and explained with the example of the sealing layer 201 having the third thermal insulation material 24 covering and enclosing the first thermal insulation material 22 and the second thermal insulation material 27 (if any) only. Referring the embodiment and alternative modes thereof illustrated in FIGS. 2s, the battery module 11 can be the battery module having thermal management design or a regular battery module constructed without heat exchange pipe. Besides, all the embodiment and alternative modes thereof illustrated in FIGS. 2s omits the system fluid circulation system, but only keeps the system fluid pipe 13 connected, coupled, and engaged with the battery device 10 in order to illustrate and disclose main ideas of the present invention rather than limit the scope of the present invention.

Figure 2A:
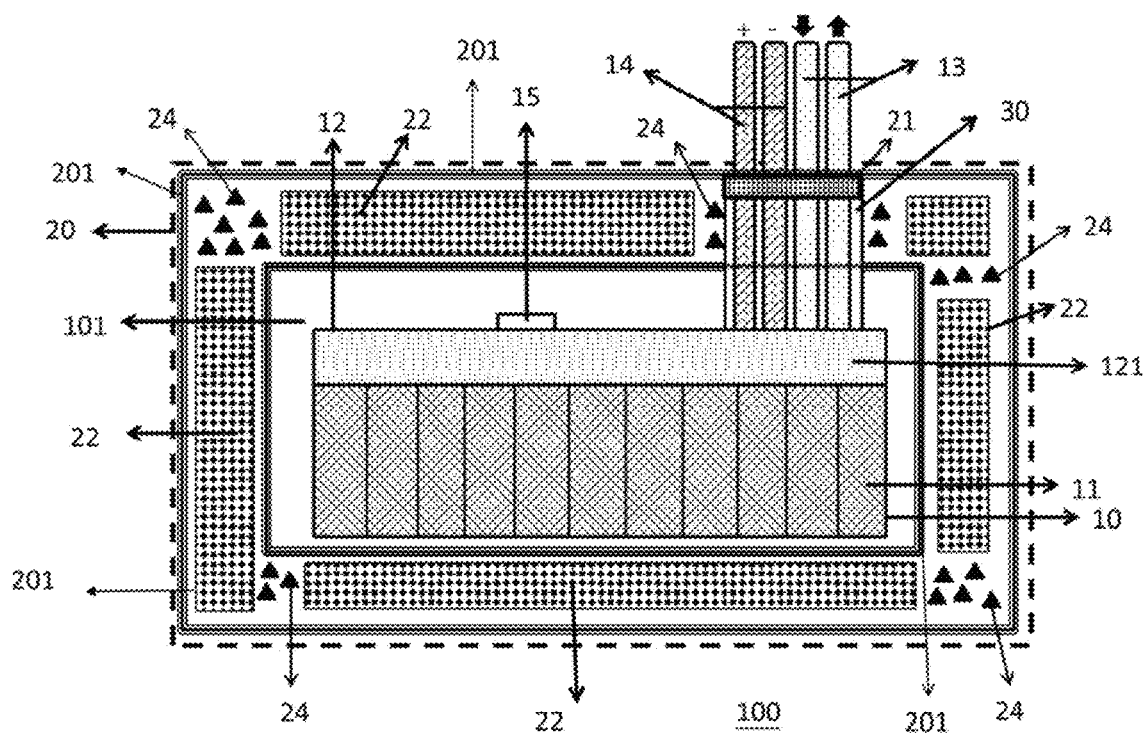
FIGS. 2a to 2g are perspective views of the battery device having thermal management design and part of the battery system according to a second embodiment of the present invention illustrating various kinds of the partial enclosure design.

FIG. 2a is a perspective view of part of the battery system 100 and battery device having thermal management design (labelled as "10" and "20" in the figures), which includes a battery device 10, formed by a plurality of battery modules 11, a positive and negative terminals electrical cable wires 14, and a flow channel device 12; a system fluid pipe 13; and an enclosure 20, which has a thermal insulation unit and a channel 30. The thermal insulation unit contains a first thermal insulation material 22, such as VIP and etc., which may be contained, disposed and provided in the sealing layer 201. Besides of the first thermal insulation material 22 (including what solely existed or provided in the sealing layer 201), a third thermal insulation material 24 can further cover the first thermal insulation material 22. The third thermal insulation material 24 that covers the first thermal insulation material 22 may also be provided and disposed in another sealing layer 201 in a form of material for thermally insulating and sealing, packaging, and enclosing the battery device 10. The channel 30 communicates the inner space 101 covered by the enclosure 20, which accommodates the battery device 10, with the outside of the enclosure 20. The system fluid pipe 13 and the positive and negative terminals electrical cable wires 14 is disposed and arranged in the channel 30. An end or part of the system fluid pipe 13 is further connected with the flow channel device 12 of the battery device 10, such that the system fluid 121, after being conditioned outside the enclosure 20, can be transported and distributed to the flow channel device 12 of the battery device 10 through the system fluid pipe 13 to form a circulation route for conducting heat exchange for the battery module 11. The channel 30 further has the thermal insulation sealing layer 21 arranged therein so as to avoid or reduce the external thermal environment of the enclosure 20 from influencing the battery cells and the battery modules 11 of the battery device 10 arranged in the enclosure 20.

Figure 2B:
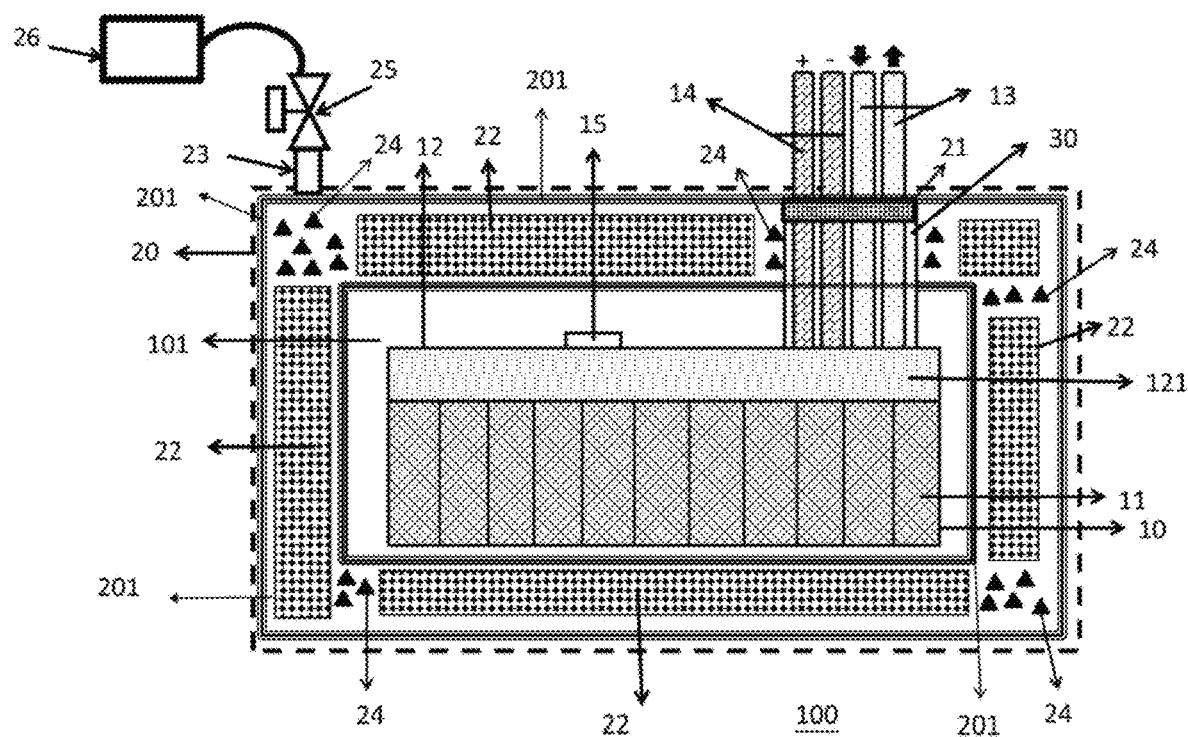

FIG. 2b illustrated a battery device having thermal management design (including "10" and "20" in the figures) and part of a battery system 100 according to an alternative mode to the above second embodiment as illustrated in FIG. 2a, wherein the third thermal insulation material 24 that covers the first thermal insulation material 22 is provided in another sealing layer 201, to be the thermal insulation unit of the enclosure 20, wherein the enclosure 20 further comprises a seal perforation 23 arranged thereon. The sealing layer 201 and the seal perforation 23 are connected. When the third thermal insulation material 24 is a porous material and does not fill out the inner space of the sealing layer 201, it may regulate the air pressure of the residual space in the sealing layer 201 through the seal perforation 23. Also, the seal perforation 23 and the valve joint 25 are connected to a vacuum apparatus 26 in the manner mentioned above and in FIG. 1(b), which would not be repeated here.

Figure 2C:
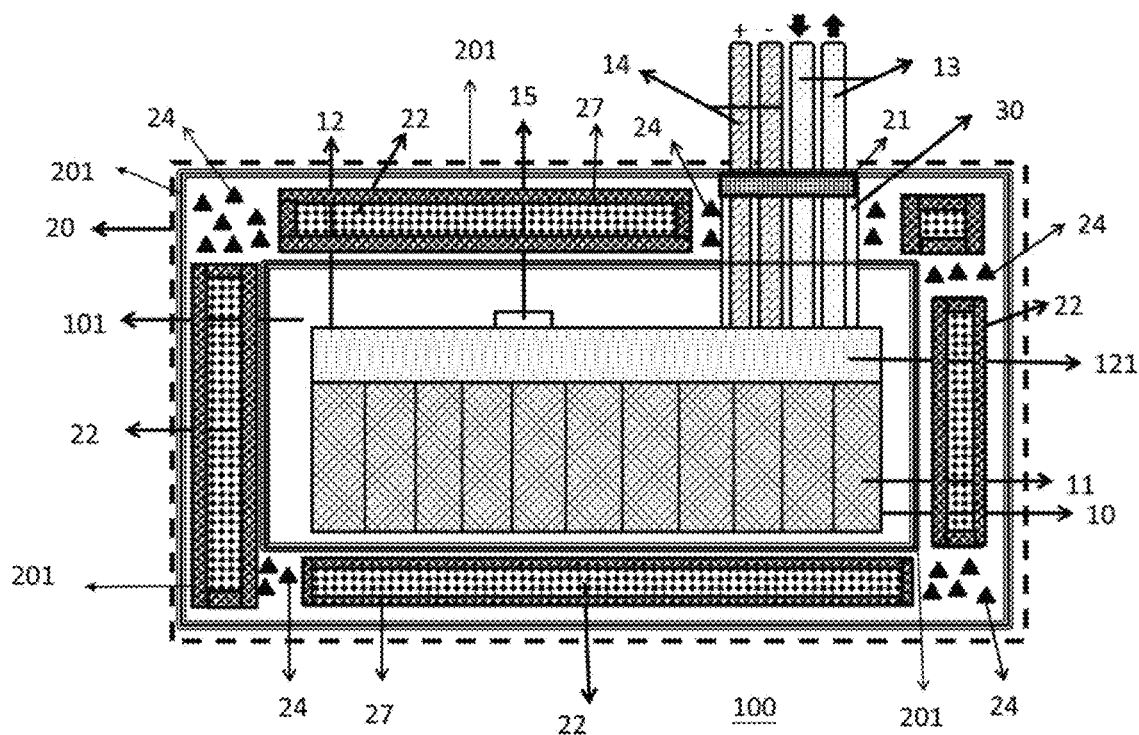

FIG. 2c illustrated a battery device having thermal management design (including "10" and "20" in the figures) and part of a battery system 100 according to an alternative mode to the above second embodiment as illustrated in FIG. 2a, wherein the inner space of the sealing layer 201 of the thermal insulation unit of the enclosure 20 includes a third thermal insulation material 24 provided therein covering, enclosing, and packaging the first thermal insulation material 22, wherein the first thermal insulation material 22 is VIP or is disposed in the inner space of the sealing layer 201, wherein the sealing layer 201 has aluminum foil or other metal foil be covered, enclosed, or coated on the surface thereof. Therefore, heat can be transmitted along the continuous surface through heat conduction via the metal foil. Then the second thermal insulation material 27 can further be applied, covered, or coated onto the surface of the metal foil of the sealing layer that has the first thermal insulation material 22 or the VIP. The thermal conductivity of the second thermal insulation material 27 is lower than the metal foil and the second thermal insulation material 27 has good attachment or adhesiveness to the metal foil by means of its own characteristic or an adhesive.

Figure 2D:
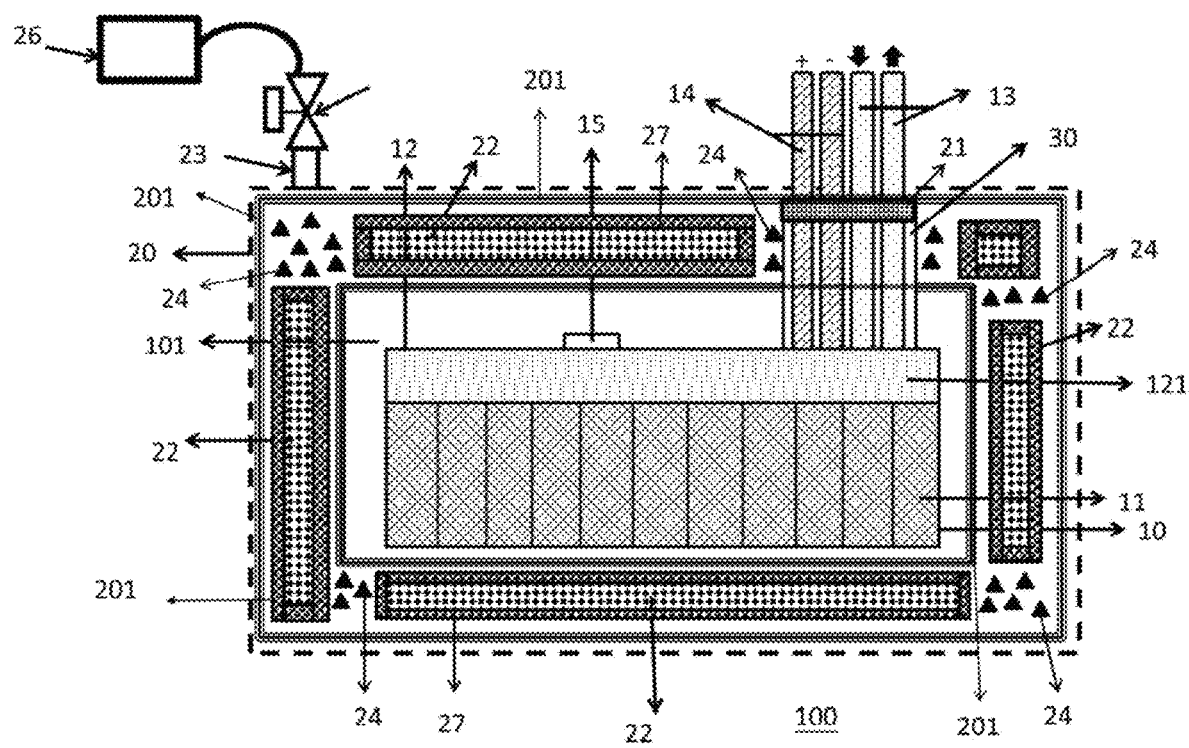

Referring to FIG. 2d, a battery device having thermal management design (including "10" and "20" in the figures) and part of a battery system 100 according to an alternative mode following by it in FIG. 2c of the above second embodiment is illustrated, wherein the enclosure 20 further comprises a seal perforation 23 arranged thereon. The sealing layer 201 and the seal perforation 23 are connected. When the third thermal insulation material 24 fails to fill out the inner space of the sealing layer 201, it may regulate the air pressure of the residual space in the sealing layer 201 through the seal perforation 23. Also, the seal perforation 23 and the valve joint 25 are connected to a vacuum apparatus 26 in the manner mentioned above and in FIG. 1b, which would not be repeated here.

Figure 2E:
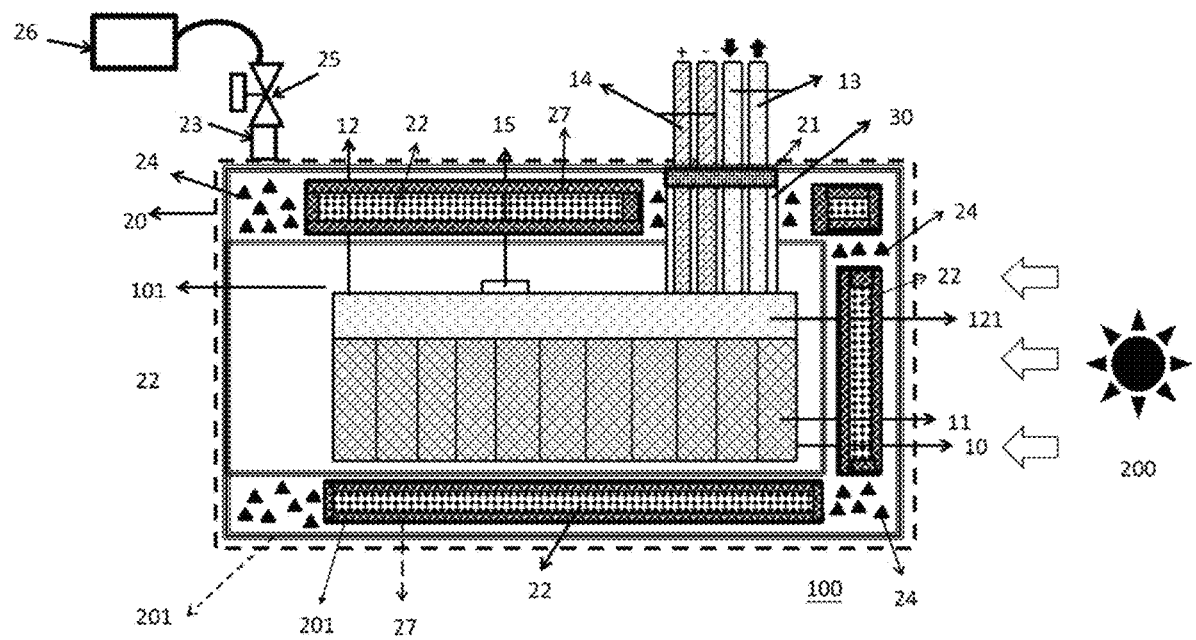

FIG. 2e illustrates a battery device having thermal management design (10+20) and part of the battery system 100 according to an alternative mode to the embodiment as illustrated in FIG. 2d, wherein if it is to avoid the impact of the heat source 200 from a specific direction, the enclosure 20 can just partially cover the battery device 10 or have only part of the thermal insulation unit arranged toward the heat source 200 from a specific direction, as long as it is enough to avoid the impact of the heat source 200. The enclosure 20 may additionally include a seal perforation 23, a valve joint 25, and a vacuum apparatus 26 arranged thereon, so as to allow the battery device to achieve a high thermal insulation performance with the vacuum state residual space as well as the first thermal insulation material 22, the second thermal insulation material 27, and the third thermal insulation material 24 disposed in the sealing layer 201 of the enclosure thereof. The manner of arrangements, usage modes, and functions of the vacuum apparatus 26 are as mentioned in FIG. 1b and the above illustration, which would not be repeated here.

Figure 2F:
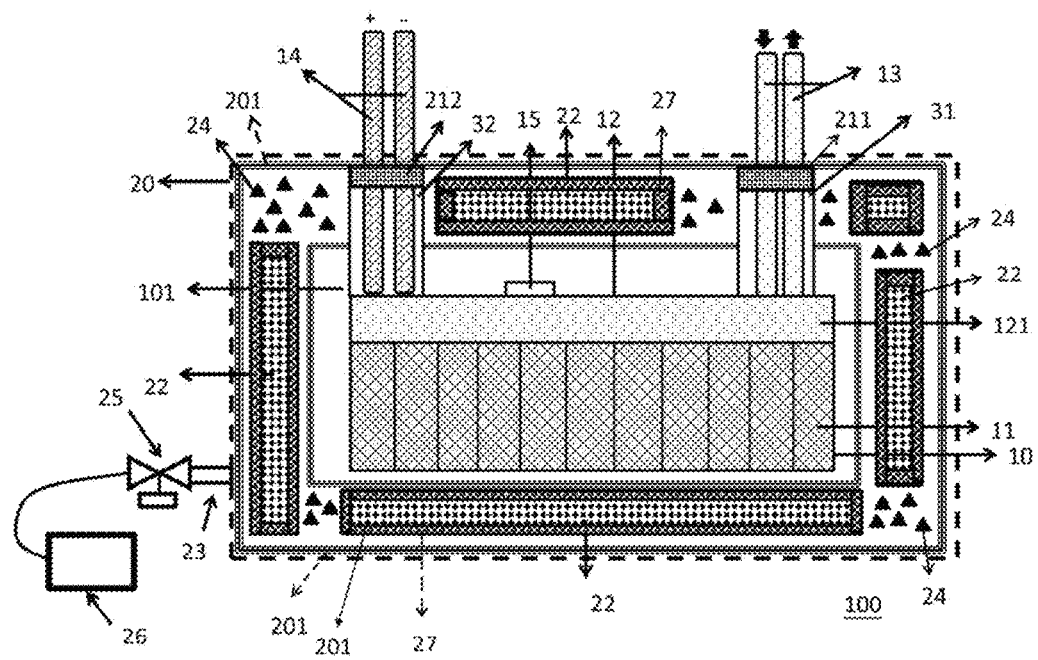

FIG. 2f illustrates a battery device having thermal management design (10+20) and part of the battery system 100 according to an alternative mode to the above fourth embodiment illustrated in FIG. 2d, wherein the enclosure 20 can further has a second channel 32 arranged thereon, wherein the thermal insulation sealing layer 211 and the thermal insulation sealing layer 212 are respectively arranged on the first channel 31 and the second channel 32. The channel 31 is for arranging and disposing the system fluid pipe 13, while the second channel 32 is for arranging and disposing the positive and negative terminals electrical cable wires 14. Besides, the enclosure 20 can further has a seal perforation 23, a valve joint 25, and a vacuum apparatus 26 arranged thereon for regulating the vacuum pressure of the residual space left by the occupation thermal insulation material in the sealing layer 201 of the enclosure 20, so as to achieve a high thermal insulation result. The manner of arrangements, usage modes, and functions of the seal perforation 23, the valve joint 25, and the vacuum apparatus 26 are as mentioned in FIG. 1b and the above illustration, which would not be repeated here.

Figure 2G:
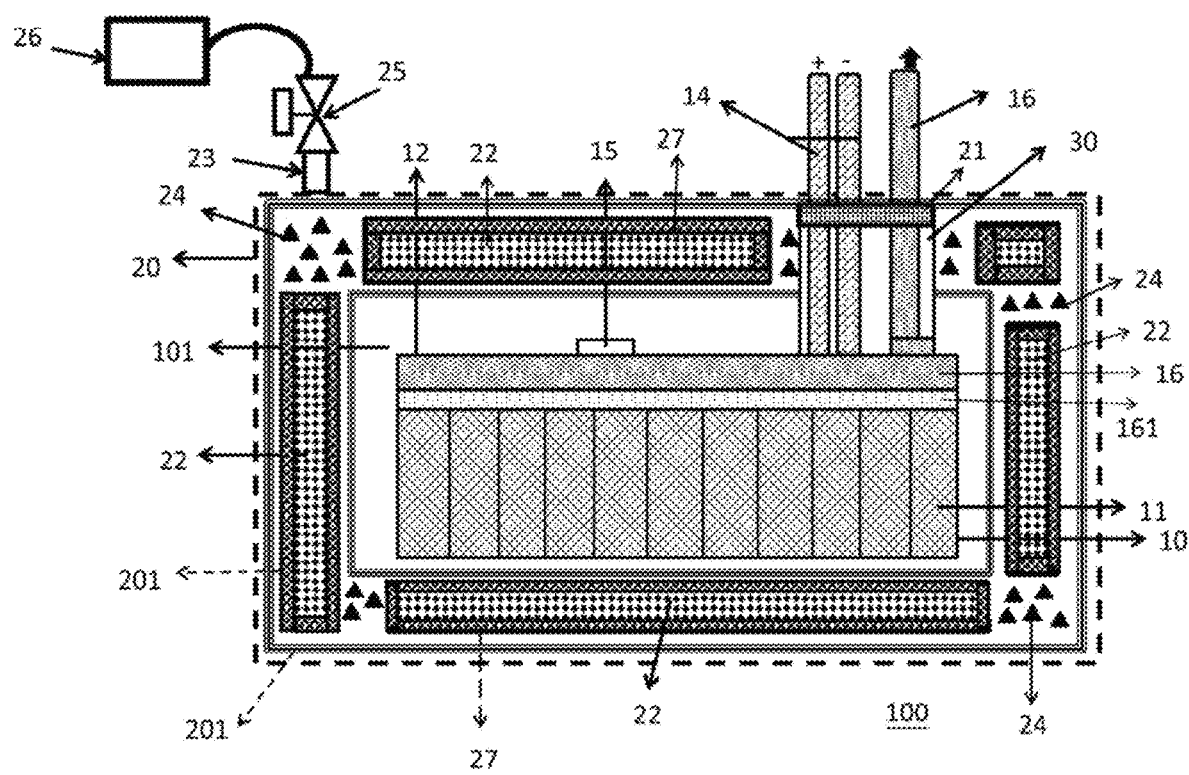

FIG. 2g illustrates a battery device having thermal management design (including "10" and "20" in the figure) and part of a battery system 100 according to an alternative mode of the above second embodiment, as shown in FIG. 2a-2f. Here, the system fluid 121, the system fluid pipe 13, and the flow channel device 12 may further be substituted by a heat pipe, which is called system heat pipe 16, so as to conduct heat exchange with the battery module 11 arranged in the enclosure 20. Heat releasing and heat absorption can be conducted respectively by means of the two-phase system fluid 121 disposed in the inner space of the system heat pipe through the gas-liquid switch and the liquid-gas switch in the two closed ends of the system heat pipe respectively. Meanwhile, the gas phase system fluid (not shown in the figure) can fast convect and flow in the system heat pipe 16, such that the heat transmission rate of the system heat pipe 16 is much higher than conventional high heat conduction rate material, such as copper, aluminum, and etc.. Here, part of the surface of one of the two closed ends of the system heat pipe 16 may directly or indirectly contact the battery module 11 for heat exchange. If the battery module 11 is the battery module having thermal management design, then the battery module 11 can exchange heat with the module heat exchange interface (not shown in the figure) and further conduct heat exchange through the heat exchangeable battery cell charging and discharging circuit (not shown in the figure) and the battery cells connected therewith. The enclosure 20 may additionally include a seal perforation 23, a valve joint 25, and a vacuum apparatus 26 arranged thereon, so as for achieving a high thermal insulation performance by means of deploying the vacuum pressure in the residual space that has not occupied by all the thermal insulation materials in the sealing layer 201 of the thermal insulation unit. The manner of arrangements, usage modes, and functions of the seal perforation 23, the valve joint 25, and the vacuum apparatus 26 are as mentioned in FIG. 1(b) and the above illustration, which would not be repeated here.

FIG. 2g illustrates the battery device having thermal management design (10+20) and part of the battery system 100 according to the above alternative mode of the above second embodiment, wherein if the system heat pipe 16 directly contacts the battery module 11, then it will require one party on part of the contact surface at the module heat exchange interface (not shown in the figure) of the battery module 11 between the system heat pipe 16 and the heat exchangeable battery cell charging and discharging circuit of the battery module 11 to be formed of non-electric conductive material that has good heat conductivity, so as to avoid external short circuit from occurring among the battery cells (not shown in the figure) in the battery module 11 or among a plurality of the battery modules 11 due to voltage levels. If the system heat pipe 16 indirectly contacts the battery module 11, then it requires a middle layer 161 arranged and provided at the module heat exchange interface (not shown in the figure) of the battery module 11 between the system heat pipe 16 and the contact surface of the heat exchangeable battery cell charging and discharging circuit of the battery module. The middle layer 161 can be a solid body, fluid, or solid-fluid compound materials that are non-electric conductive, but has good heat conductivity. The fluid can be a single phase fluid or liquid-gas two-phase fluid. The fluid has to be sealed and enclosed in a closed or sealed space, in order to create and form the middle layer 161.

FIG. 2g illustrates the battery device having thermal management design (10+20) and part of the battery system 100 according to the above alternative mode of the above second embodiment, wherein if the middle layer 161 at the module heat exchange interface (not shown in the figure) on the contact surface between the system heat pipe 16 and the heat exchangeable battery cell charging and discharging circuit is a sealed space having liquid-gas two-phase fluid, it may further utilize the gas-liquid change and the liquid-gas change to absorb and release heat at the contact surface between the system heat pipe and the heat exchangeable battery cell charging and discharging circuit. The passive heat transmission mechanism of such type of heat pipe and the gas-liquid fluid circulation balance in a sealed space can greatly enhance the heat transmission rate, such that when the battery cells of the battery module 11 requires temperature control, it can rely on the system heat pipe 16 and the middle layer 161 to quickly control the temperature. Besides, temperatures of the battery cells (not shown in the figure) among a plurality of the battery modules 11 can also be better uniformity through the middle layer 161 by such passive means. In addition, for the battery system 100 of the battery device having thermal management design (10+20), the quantity of the system heat pipe 16 can be single or multiple. If it is multiple, then the system heat pipes 16 can be combined, connected, and coupled in a parallel manner.

FIG. 2g illustrates the battery device having thermal management design (10+20) and part of the battery system 100 according to the above alternative mode of the above second embodiment, wherein in the module heat exchange interface (not shown in the figure) of the battery module 11, the system heat pipe 16 can be replaced by a plurality of heat pipes, in order for the flexibility and convenience of actual utilization. These heat pipes form good heat path thereamong through direct or indirect contact. According to the present mode, the system fluid heat pipe (not shown in the figure) formed and constructed by the system fluid 121 and the system fluid pipe 13 in addition to the flow channel heat pipe (not shown in the figure) formed and constructed by the system fluid 121 and the flow channel device 12 can be utilized to substitute a sole system heat pipe. Here, the flow channel heat pipe acts to directly exchange heat with the heat exchange pipe (not shown in the figure) or indirectly exchange heat with the heat exchange pipe through the middle layer 161 at the module heat exchange interface of the battery module 11, while the system fluid heat pipe acts to exchange heat with the system fluid temperature control device (not shown in the figure) of the system fluid circulation device (not shown in the figure) of the battery system 100. The flow channel heat pipe and the system fluid heat pipe contact each other in the manner of series connection, wherein the contact can be directly or indirectly through heat conducting gel or other materials having good heat conductivity and flat contact surface, so as to modify the contact surface between the system fluid heat pipe and the flow channel heat pipe in order to provide it a good heat conduction.

FIG. 2g illustrates a battery device having thermal management design (10+20) and part of the battery system 100 according to the above embodiment, wherein the middle layer 161 between the system heat pipe 16 and the battery module 11 in the module heat exchange interface (not shown in the figure) of the battery module 11 is a solid matter, which composition materials can be: ceramic materials (such as boron nitride, aluminum nitride, silicon carbide, aluminum oxide, zinc oxide, and etc.), heat conduction plastics (such as PP, Nylon, PBT, PET, PPS, ABS, PC, and etc.), and combinations thereof.

According to the battery device having thermal management design (10+20) and part of the battery system 100 according to the above embodiment, as illustrated in FIG. 2g, it is a fluid or solid-liquid compound materials provided in the middle layer between the system heat pipe 16 and the battery module 11 in the module heat exchange interface (not shown in the figure) of the battery module 11. The fluid is liquid state, gas state and/or gas-liquid two-phase. The liquid state fluid can be solutions like refrigerant, dimethyl ether, pure water, water-glycol, water-propylene glycol, other liquid state fluid that does not react with the components of the battery device 10 and the system heat pipe 16 it contacts, and etc.. The gas state fluid can be like water vapor, air, other gas state fluid that does not react with the components of the battery device 10 and the system heat pipe 16 it contacts, and etc.. The gas-liquid two-phase fluid can be like water and water vapor, acetone and acetone vapor, other gas-liquid two-phase fluid that does not react with the components of the battery device 10 and the system heat pipe 16 it contacts. and etc.. Meanwhile, related information regarding the solid-liquid compound materials is mentioned in the previous paragraph.

FIGS. 2a-2g illustrate embodiments of a battery device having thermal management design (including "10" and "20" in the figures) and part of the battery system 100. The battery device 10 according to any of the embodiments further comprises a battery management system (BMS) 15 disposed therein. The battery management system 15 is capable of detecting the voltage and temperature of the battery module 11 in the battery device, communicating with external master control system (not shown in the figures) through wireless communication or signal transmission line, and conducting proper control activities.

Figure 3B:
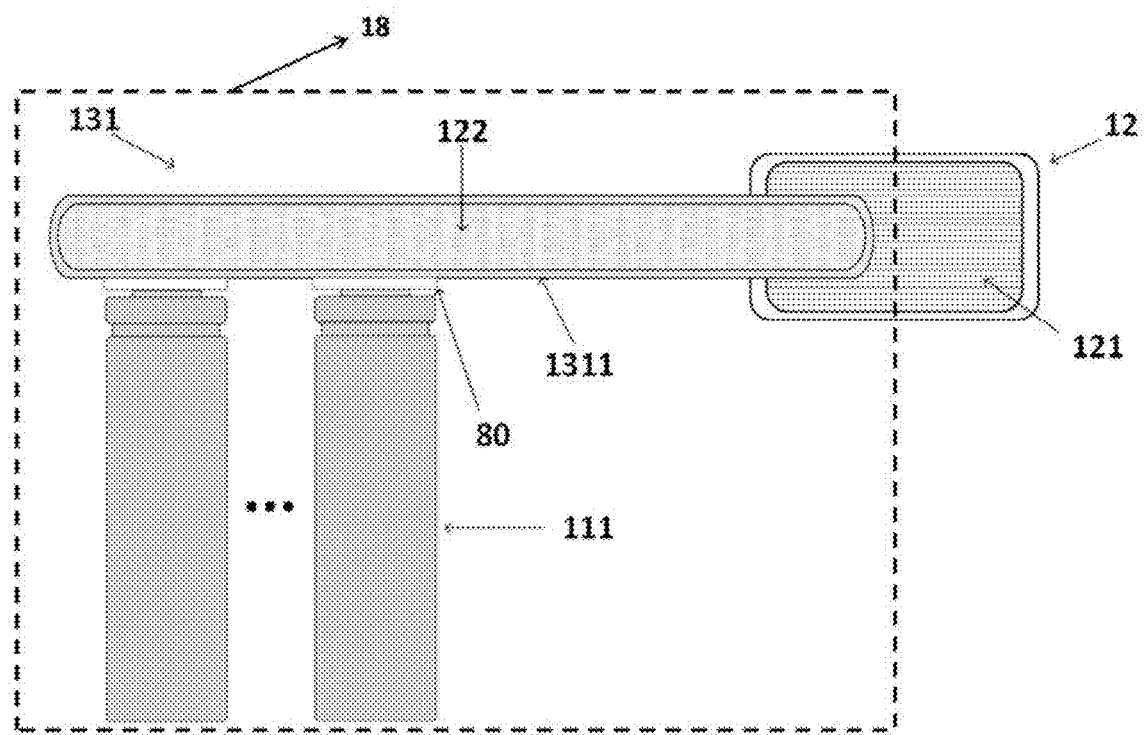
FIGS. 3a-(1) to 3a-(2), FIGS. 3b to 3d, FIGS. 3e-(1) to 3e-(3), FIG. 3f, and FIGS. 3g-(1) to 3g-(5) are perspective views of the module heat exchange interface and the heat exchangeable battery cell charging and discharging circuit of the battery module having thermal management design according to a third embodiment of the present invention.
Figure 3C:
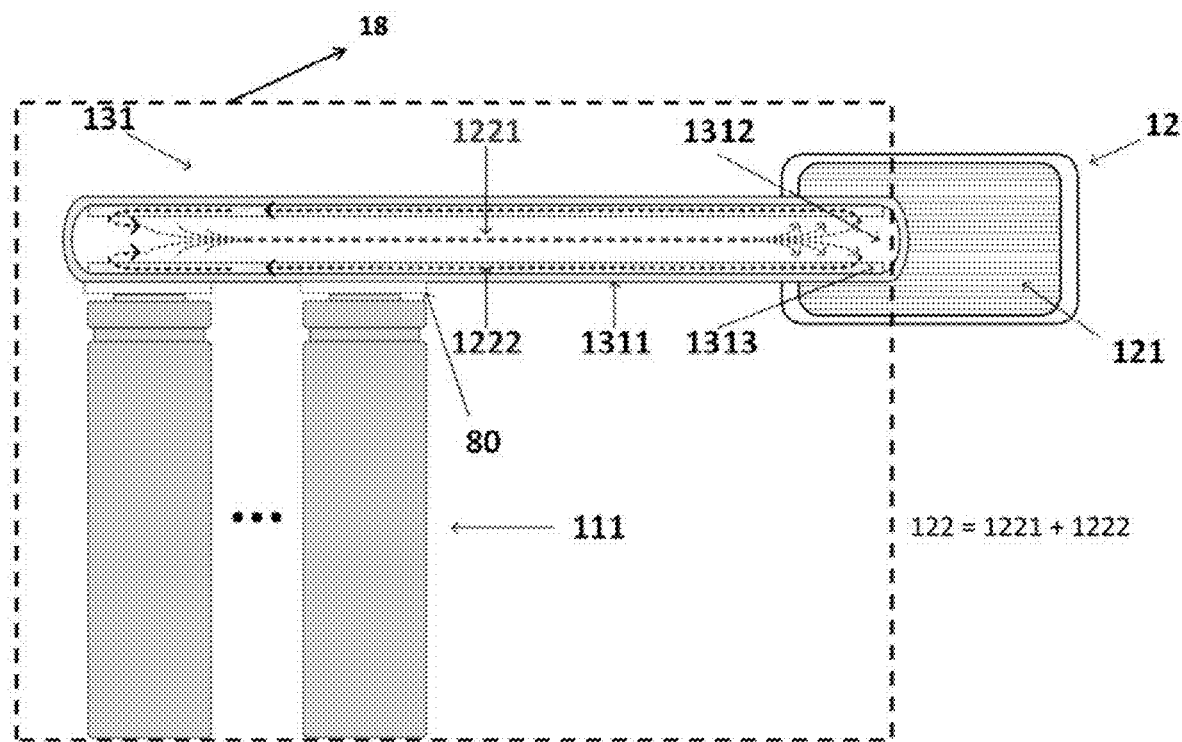
Figure 3F:
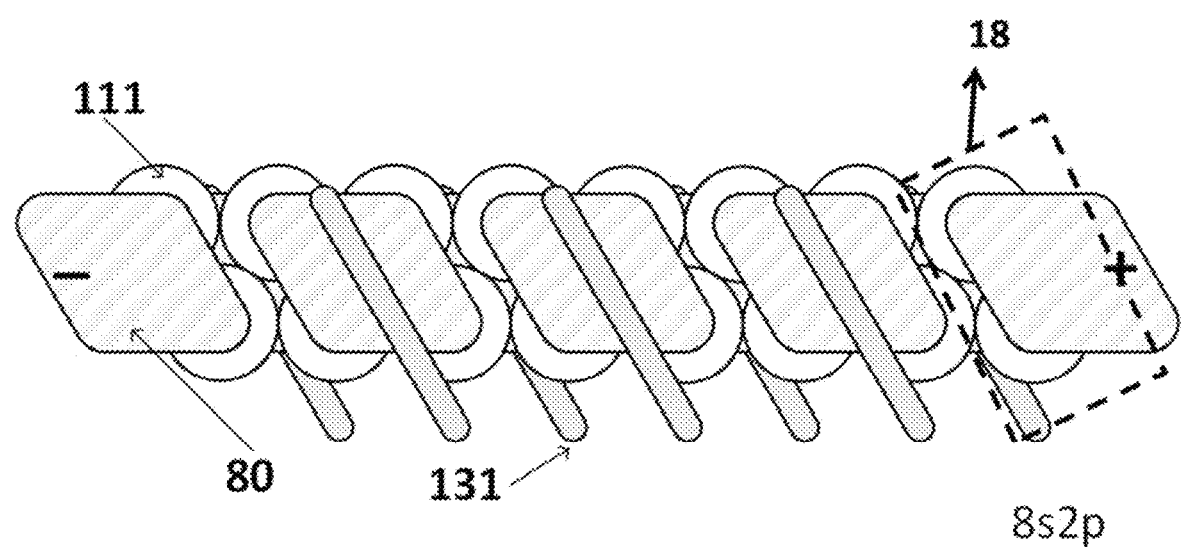

FIGS. 3a-(1) to 3a-(2), FIGS. 3b to 3d, FIGS. 3e-(1) to 3e-(3), FIG. 3f, and FIGS. 3g-(1) to 3g-(5) are perspective views of a battery module 11 having thermal management design according to a third embodiment of the present invention, mainly including (i) the heat exchangeable battery cell charging and discharging circuit and (ii) the module heat exchange interface. The battery module 11 having thermal management design can cooperate and be integrated with the battery device having thermal management design and/or the battery system having thermal management design or regular battery device and/or battery system without thermal management. According to the present embodiment, the battery module 11 having thermal management design is part of the battery device having thermal management design and coordinated with the battery system having thermal management design. FIG. 3a is a perspective view of the heat exchangeable battery cell charging and discharging circuit of the battery module having thermal management design 11 and part of the battery device having thermal management design (not indicated in the figure). The battery module 11 comprises and is constructed by a battery cell 111, a battery cell affixing member (not indicated in the figure), a voltage measuring circuit (not indicated in the figure), a temperature sensing device (not indicated in the figure), and the heat exchangeable battery cell charging and discharging circuit. The heat exchange pipe 131 is mainly a metal outer tube 1311 with both ends sealed and closed, wherein the hollow and closed internal space of the tube contains a heat exchange pipe fluid 122. The metal outer tube 1311 of the heat exchange pipe 131 is connected, engaged, and coupled with the battery cell 111 through soldering, ultrasonic bonding, or other technology, so as to form a parallel set 18 to utilize the metal outer tube 1311 of the heat exchange pipe 131 as an electric current path to charge and discharge the battery cell 111. In addition, the heat produced during the charging and discharging at the battery cell and the metal outer tube 1311 of the heat exchange pipe 131 can directly be dissipated by the heat exchange pipe 131 through transmitting the heat to the module heat exchange interface of the battery module 11. On the contrary, if it is to heat up the battery cell, it can utilize this heat dissipation path reversely. According to the present embodiment, the module heat exchange interface is constructed by the immediate contact interface between the system fluid 121 in the flow channel device 12 of the battery device having thermal management design and the outer tube 1311 of part of the heat exchange pipe 131. A difference between the modes illustrated in FIG. 3*a*-(1) and FIG. 3*a*-(2) is diverse designs in the module heat exchange interface. Both of them allow the battery cell 111 in the battery module 11 to exchange heat through the heat exchange pipe fluid 122 in the heat exchange pipe 131, the metal outer tube 1311 of the heat exchange pipe, and the system fluid 121 in the flow channel device 12 of the battery device having thermal management design, so as to allow the battery cell 111 of the battery module 11 to achieve fast and high energy efficient thermal management. In order to simplify the description, "FIG. 3*a*" mentioned below refers to FIG. 3*a*-(1), though it may also include the characteristics of FIG. 3*a*-(2) or other similar design.

FIG. 3*b* illustrates a battery module having thermal management design 11 according to an alternative mode to the above third embodiment as illustrated in FIG. 3*a*, wherein the heat exchangeable battery cell charging and discharging circuit further comprises a metal structural element 80 arranged between the battery cells 111 and the metal outer tube 1311 of the heat exchange pipe 131 and respectively connected with the battery cells 111 and the metal outer tube 1311 of the heat exchange pipe 131 through soldering, ultrasonic bonding, or other technology, so as to form the parallel set 18, so as to allow the battery cells 111 of the heat exchange pipe 131 to exchange heat with the system fluid 121 disposed in the flow channel device 12 of the battery device having thermal management design (not shown in the figure) through the metal structural element 80, the heat exchange pipe fluid 122 disposed in the heat exchange pipe 131, and the metal outer tube 1311 of the heat exchange pipe 131.

FIG. 3*c* illustrates a battery module having thermal management design 11 according to an alternative mode to the above third embodiment as illustrated in FIG. 3*c*, wherein for the heat exchangeable battery cell charging and discharging circuit, if the heat exchange pipe fluid 122 disposed and enclosed in the heat exchange pipe 131 is the gas (1221)-liquid (1222) two-phase liquid 122 (which is "1221"+"1222"), when the battery cells 111 of the battery module 11 requires temperature control (such as charging and discharging rendering overly high temperature of the battery cells 111 and etc.), the heat generated from the battery cells 111 can be transmitted to the heat exchange pipe 131 through the metal structural element 80 of the heat exchangeable battery cell charging and discharging circuit, and then exchanged to the system fluid 121 provided in the flow channel device 12 arranged in the battery device having thermal management design (not shown in the figure) and the module heat exchange interface through heat conduction and heat convection respectively by the metal outer tube 1311 of the heat exchange pipe 131 and the heat exchange pipe fluid 122 enclosed therein, so as to rapidly cool down the battery cells 111. On the contrary, if the thermal environment is too low and it requires heating up the battery cells 111, it may also utilize the same heat transmission path to heat up the battery cells 111 with heated system fluid 121. The heat exchange pipe fluid 1222 in the internal closed space 1312 of the heat exchange pipe 131 utilizes the phase change to absorb massive heat in the high temperature end and to change into the gas state heat exchange pipe fluid 1221, such that it can fast transfer in the gas state heat exchange pipe fluid 1221 form. Then, it can change phase again in the low temperature end, so as to release the heat from the heat exchange pipe fluid 1221 and to condense it into the liquid state heat exchange pipe fluid 1222. Then, the liquid state heat exchange pipe fluid 1222 can be transported and distributed to the high temperature end through a wick. The above circulation can greatly enhance the transmission speed and heat transmission of the heat exchange and heat conduction.

FIG. 3*c* 3*b* illustrates a battery module having thermal management design 11 according to the above embodiment, wherein the heat exchange pipe fluid 122 in the heat exchangeable battery cell charging and discharging circuit is a gas-liquid two-phase fluid (1221+1222), such as water and water vapor, acetone and acetone vapor, other two-phase fluid that does not react with the wick 1313 and the metal outer tube 1311 of the heat exchange pipe that it contacts, and etc..

FIG. 3*c* 3*b* illustrates a battery module having thermal management design 11 according to an alternative mode to the above third embodiment. In the heat exchangeable battery cell charging and discharging circuit, the heat exchange pipe 131 can be a module heat pipe and have the heat exchange pipe fluid 122 therein except for the internal closed space 1312. It further absorbs or releases massive heat through the phase change between liquid-gas and gas-liquid. The gas in the internal closed space 1312 is mainly a gas state heat exchange pipe fluid 1221, which is able to quickly transferred and distributed to greatly enhance the heat conduction speed. Besides, the heat exchange pipe also has a wick 1313, such that the liquid state heat exchange pipe fluid 1222 can be transferred and distributed through the wick 1313, so as to be respectively changed into gas state and liquid state in the hot zone and cool zone for the two-phase fluid circulation and distribution. Generally, its heat conductivity is several hundred times better than good heat conductors like copper or aluminum.

A battery module having thermal management design is illustrated in FIG. 3*d* according to the above third embodiment as illustrated in FIG. 3*c*, wherein the flow channel device 12 and the system fluid 121 of the battery device having thermal management design (not labelled in the figures) may also be arranged and disposed at the two ends of the heat exchange pipe 131, so as to control the temperature of the battery cells 111 coupled and connected with the middle part of the heat exchange pipe 131, such that it can achieve a highly efficient thermal management for the battery cells 111 in the battery module 11. Here, other related detail has been disclosed in the above, which would not be repeated.

FIG. 3e 3b illustrates a battery module having thermal management design 11 according to the above embodiment, wherein the battery module 11 comprises a plurality of battery cells 111, a plurality of metal structural element 80, a flow channel device (not shown in the figure), the a system fluid (not shown in the figure). The metal structural element 80 is connected, integrated, and coupled with a plurality of the battery cells in parallel so as to form and construct the parallel set 18 that allows at least one of the electrodes of the parallel set 18 to charge and discharge through the heat exchangeable battery cell charging and discharging circuit formed and constructed by the metal structural element 80 and multiple or single heat exchange pipes 131. Here, in the heat exchangeable battery cell charging and discharging circuit, the metal structural element 80 and the heat exchange pipes 131 can be flexibly arranged and assembled based on actual needs. For example, it may have odd number of the metal structural element be arranged with odd number of the heat exchange pipe 131 (as illustrated in FIG. 3e-(1), 1s16p) to form the parallel set 18 or have multiple metal structural elements be arranged with single heat exchange pipe 131 (as illustrated in FIG. 3e-(2), 1s16p) to form the parallel set 18 or have multiple metal structural elements be arranged with multiple heat exchange pipes 131 (as illustrated in FIG. 3e-(3), 1s24p) to form the parallel set 18. Besides it can even further have multiple parallel sets 18 be series connected through multiple heat exchange pipes (as illustrated in FIG. 3f, 8s2p) to form and construct a complete battery module 11.

Referring to FIGS. 3a-3f, for the battery module having thermal management design according to various alternative modes of the above third embodiment, the heat exchange pipe 131 may also be integrated and coupled with one of the electrodes of the parallel set 18 only (as illustrated in FIG. 3a, 3b, 3c, or 3e) or with both the electrodes of the parallel set 18 (as illustrated in FIGS. 3f). If the battery cells 111 needs to be heated up, then an end of the heat exchange pipe 131 for all the modes of FIGS. 3a, 3b, 3c, 3e, and 3f is the hot zone (which is the part connected with the battery cells 111 and part of the heat exchangeable battery cell charging and discharging circuit), while the other end thereof utilizing the system fluid 121 of the battery device having thermal management design (not shown in the figures) for cooling is a cool zone (which is the part not connected with the battery cells 111 and part of the module heat exchange interface). However, it may also have both ends of the heat exchange pipe 131 be cool zones and have the middle part of the heat exchange pipe 131 be the hot zone coupled and connected with the battery cells 111, as illustrated in FIG. 3d. In this case, if the battery cells 111 have to be heated up, the hot zone and the cool zones of the heat exchange pipe 131 can be switched and reversed.

Besides, shape of the heat exchange pipe 131 can also be altered based on the need, which shall not be limited by the modes illustrated in FIGS. 3a-3f.

In the battery module having thermal management design 11 according to the above third embodiment, as illustrated in FIGS. 3a-3f, the metal structural element 80 is formed by and made of a high thermal conductive material and is a good electric conductor, such as metallic material like copper, aluminum, and etc..

FIG. 3g illustrates a battery module having thermal management design 11 according to an alternative mode to the above third embodiment as illustrated in FIGS. 3a-3f, wherein if the battery module having thermal management design 11 is part of the battery device having thermal management design (not shown in the figure) and the system fluid 121 and the flow channel device 12 of the battery device having thermal management design is further integrated, coupled, and combined with the system fluid pipe 13 of the system fluid circulation device of the battery system having thermal management design (not shown in the figure) into the system heat pipe 16, then, in the module heat exchange interface, the middle layer 161 is solid if part of the system heat pipe 16 and the surface of the outer tube 1311 of the heat exchange pipe 131 directly contact each other (FIG. 3g-(1)) or indirectly contact each other (FIG. 3g-(2)), whereas, referring to FIG. 3g-(3), the middle layer 161 is a sealed, enclosed, and closed hollow space having fluid therein or a sealed, enclosed, and closed hollow space having solid-fluid compound materials therein. Then it allows the battery cells 111 of the battery module 11 to exchange heat through the heat exchange pipe 131 and the system heat pipe 16. Here, related details regarding implementations and materials have disclosed above and would not be repeated.

FIG. 3g-(4) illustrates a battery module having thermal management design 11 according to the above third embodiment, wherein the battery module 11 (4s16p) is constructed and formed by series connected parallel sets 18, wherein each of the parallel sets 18 comprises four sets of 16 battery cells 111 connected in parallel. In order to make the thermal management design of the assembly of the parallel set 18 of the four sets of 1s16p in the battery module 11 more clear and understandable, the figure does not show the series connection among them. The module heat exchange interface according to the present mode is formed by the middle layer 161, part of the metal outer tubes (not shown in the figure) of the heat exchange pipe 131, and part of the metal outer tube 1611 of the system heat pipe 161. This is one of the special cases to FIG. 3g-(3). The middle layer 161 is a hollow sealed and closed space containing fluid and the fluid can be two-phase fluid of gas 1621-liquid 1631 state, which utilizes heat pipe-like heat exchange mode to transmit the heat through the gas 1621-liquid 1631 change and the liquid 1631-gas 1621 change between the metal outer tube 1611 of the system heat pipe 16 and the surface of the metal outer tubes (not shown in the figure) of the four sets of the heat exchange pipes 131. The four sets of the heat exchange pipes 131 form the main portion of the heat exchangeable battery cell charging and discharging circuit in the battery module 11, adapted for conducting heat exchange and charging and discharging processes with the metal structural element 80 and the battery cells 111. In addition, according to the present mode, the system heat pipe 16 and the four sets of the heat exchange pipes 131 are respectively located in the two sides of the middle layer 161. The shell of the middle layer 161 is respectively coupled, engaged, connected, and integrated with the metal outer tubes of the four sets of the heat exchange pipes 131 and the metal outer tube 1611 of the system heat pipe 16 as well as maintains a sealed and closed hollow middle layer 161, so as to allow part of the surface of the metal outer tube 1611 of the system heat pipe 16 and the metal outer tubes of the four sets of the heat exchange pipes 131 to directly contact the two-phase fluid in the middle layer 161. Also, it requires a proper insulation arrangement among the metal outer tubes of the four sets of the heat exchange pipes 131 so as to prevent the risk of short circuit thereamong. For instance, there can be a thin insulating layer (not shown in the figure) arranged between the metal outer tubes of the four sets of the heat exchange pipe 131 and the shell of the middle layer 161. The composition material of the thin insulating layer can be solid state electrical insulating material having good heat conductivity, as mentioned and disclosed previously, which would not be repeated here. When the heat is transmitted from the four sets of the heat exchange pipe 131 to the two-phase fluid (1621, 1631) disposed and provided in the middle layer 161, and then to the system heat pipe 16, the two-phase system fluid in the system heat pipe 16 will again through the gas 1620-liquid 1630 change and the liquid 1630-gas 1620 change to transmit the heat to the end of the system heat pipe 16 for heat exchange with the system fluid temperature control device 41. Then it utilizes the system fluid temperature control device 41 to cool down the gas phase system fluid 1620. The cooled liquid phase system fluid 1630 is then transported and delivered to the middle layer 161 by means of capillarity through the wick 1650 to cool down the surface of the four sets of the heat exchange pipes 131 based on heat pipe-like principle. Here, the heat exchange pipe 131 can be a module heat pipe.

FIG. 3g-(5) illustrates a battery module having thermal management design 11 according to the above third embodiment as illustrated in FIG. 3a-(4). It is noted that this illustrated heat dissipation of the battery cells. If it has to heat up the battery cells, the direction of heat transmission will be the opposite. Here, the module heat exchange interface of the battery module 11 having thermal management design is a direct contact surface between four sets of the heat exchange pipes 131 and system fluid of two phases (1620, 1630). The surface of metal outer tubes (not shown in the figure) of the four sets of the heat exchange pipes 131 is directly connected, integrated, and engaged with the metal outer tube 1611 of the system heat pipe 16, so as to allow part of the surface of the metal outer tube of the four sets of the heat exchange pipe 131 to directly contact and engage the system fluid of two phases (1620, 1630) in the system heat pipe 16. Because the four sets of the heat exchange pipe 131 must be certainly free from the risk of short circuit, hence, it has to add a thin insulating layer (not shown in the figure) between the metal outer tubes of the four sets of the heat exchange pipe 131 and the shell of the middle layer 161. The composition material of the thin insulating layer can be the solid state electrical insulating material having good heat conductivity, as mentioned in description for FIG. 2g, which would not be repeated here. The four sets of the heat exchange pipe 131 transmit the heat from the end thereof that directly contact the system fluid of two phases (1620, 1630) in the system heat pipe 16 to the end thereof having the system fluid temperature control device 41 through the gas-liquid or liquid-gas change of the system fluid. Then it utilizes the system fluid temperature control device 41 to cool down the gas phase system fluid 1620. The cooled liquid phase system fluid 1630 is then transported and delivered onto the surface of the metal outer tubes of the four sets of the heat exchange pipe 131 by means of capillarity through the wick 1650. Here, the heat exchange pipe 131 can be a module heat pipe. The system heat pipe 16 may be substituted by a plurality of heat pipes, as disclosed previously.

Figure 4A:
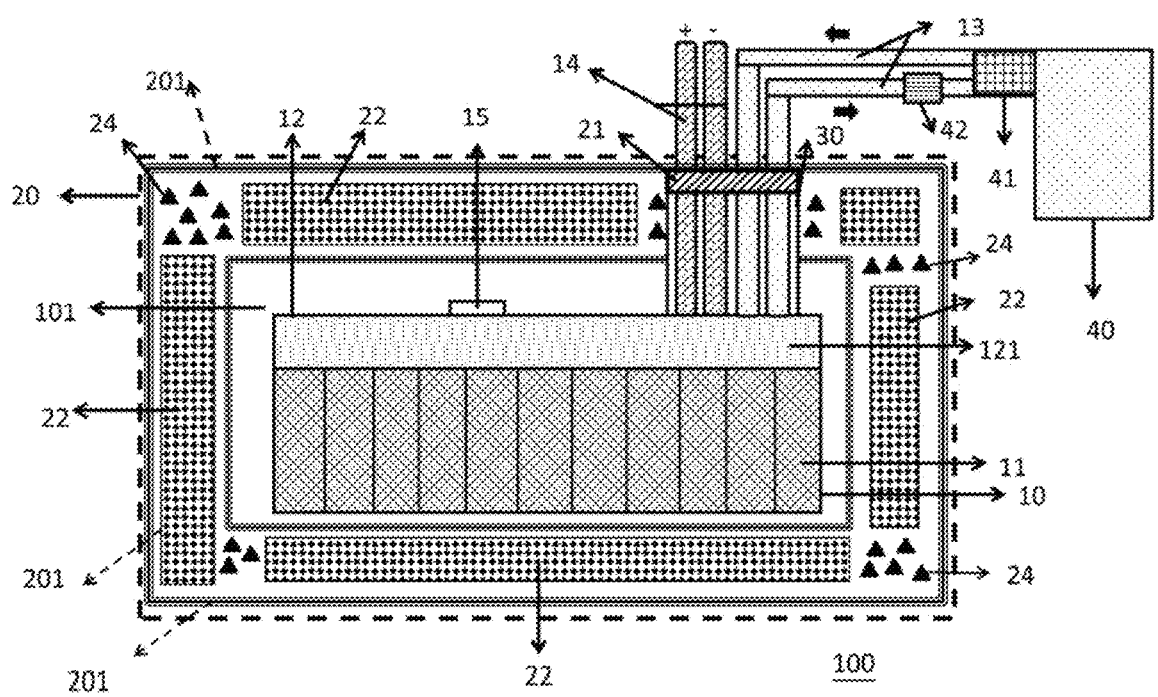
FIGS. 4a to 4g are perspective views of the battery system having thermal management design according to a fourth embodiment of the present invention.

FIGS. 4a-4g are perspective views of a battery system having thermal management design according to a fourth embodiment of the present invention, which mainly indicated the overall heat exchange design of the battery system 100. Here, the battery module can be embodied as the battery module having thermal management design having the heat exchangeable battery cell charging and discharging circuit and the module heat exchange interface that has the heat exchange pipe, as illustrated in FIG. 3s. Or it can also be embodied as a battery module without the battery cell charging and discharging circuit of the heat exchange pipe and/or the module heat exchange interface. FIG. 4a illustrated a battery system having thermal management design 100 according to the above fourth embodiment of the present invention, which comprises the battery device having thermal management design 10 (except for the enclosure 20), the system fluid circulation device, and the enclosure 20. The battery device having thermal management design 10 (except for the enclosure 20) is constructed and formed by a plurality of the battery modules having thermal management design 11, the positive and negative terminals electrical cable wires 14, and the flow channel device 12. The system fluid circulation device comprises the system fluid pipe 13, the system fluid storage device 40, the system fluid temperature control device 41, and the system fluid delivery device 42. The enclosure 20 comprises the thermal insulation unit, the channel 30, and the thermal insulation sealing layer 21, adapted for preventing or reducing the impact of the environmental temperature outside the enclosure 20 to the temperature of the battery device 10 in the enclosure 20. According to the present embodiment, the thermal insulation unit of the enclosure 20 comprises the first thermal insulation material 22 and the third thermal insulation material 24 to thermal insulate the battery device 10. The channel 30 communicates and connects the external space of the enclosure 20 and the inner space 101 covered, enclosed, and accommodated by the enclosure 20. The system fluid pipe 13 and the positive and negative terminals electrical cable wires 14 are arranged in the channel 30. The system fluid pipe 13 in the channel 30 is further engaged and connected with the flow channel device 12 of the battery device 10, so as to allow the temperature-controlled system fluid 121 to be transported and distributed through the system fluid pipe 13 to the flow channel device 12 in the enclosure 20 to exchange heat with the module heat exchange interface of the battery module 11. In the system fluid circulation device, the system fluid storage device 40, the system fluid temperature control device 41, the system fluid delivery device 42, and the system fluid pipe 13 are series connected. The other end or the other part of the system fluid pipe 13 is connected with the flow channel device 12 in the battery device 10. It utilizes the system fluid delivery device 42 to transport and distribute the system fluid 121 in the system fluid circulation device and utilizes the system fluid temperature control device 41 to heat up or cool down the system fluid 121. Then the temperature-controlled system fluid 121 can be stored in the system fluid storage device 40, which has thermal insulation mechanism, or, based on the needs, be directly returned to the system fluid pipe 13 to enter the flow channel device 12 for conducting heat exchange with the battery module 11 of the battery device 10 at the module heat exchange interface and for conducting heat exchange with the battery cells 111 of the battery module 11 through the heat exchangeable battery cell charging and discharging circuit. The system fluid 121 mentioned above is a water-propylene glycol solution. Nevertheless, one may, based on the needs, to choose fluid in other states, such as liquid state, gas state, gas-liquid two-phase, and etc., as illustrated above.

Figure 4B:
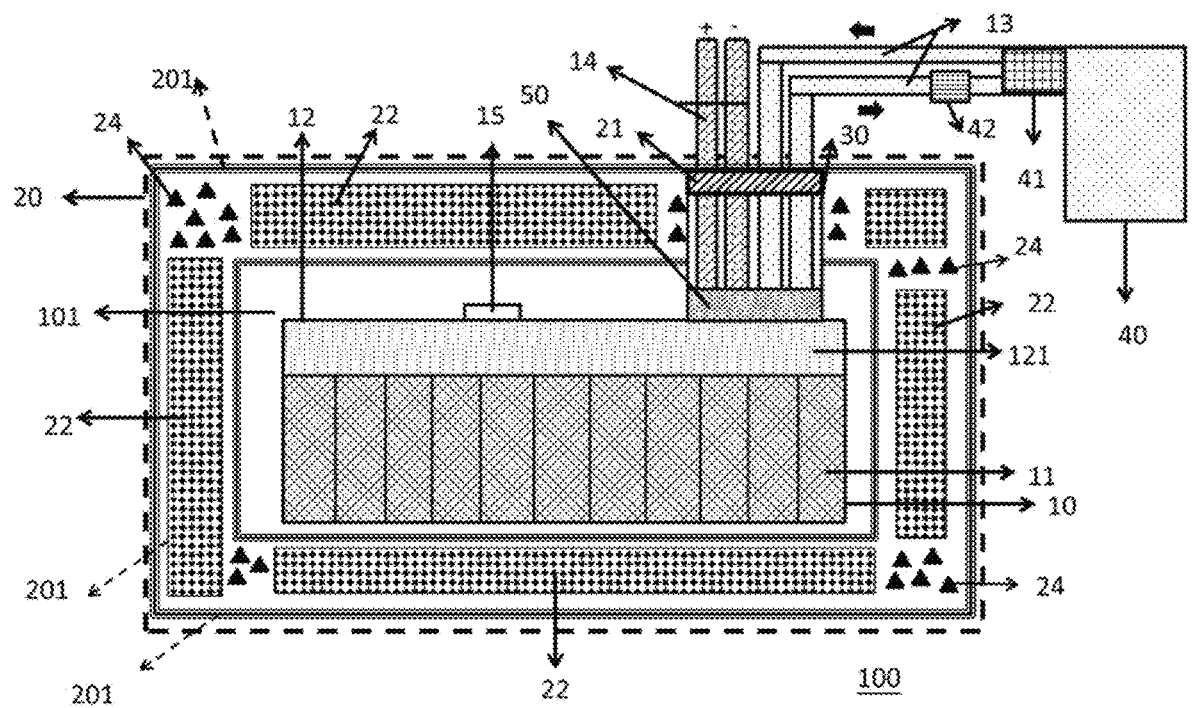

FIG. 4b illustrates a battery system having thermal management design 100 according to an alternative mode to the above fourth embodiment illustrated in FIG. 4a, further comprising a branch pipe 50 provided and arranged between the positive and negative terminals electrical cable wires 14 and the battery device having thermal management design 10, wherein the branch pipe 50 and the system fluid pipe 13 are connected and there is a valve (not shown in the figure) arranged therebetween for controlling the flow and circulation of the system fluid 121 into the branch pipe 50 for the heat exchange to the positive and negative terminals electrical cable wires 14. In this manner, it can avoid or reduce the impact to the temperature of the battery device 10 through heat conduction from the positive and negative terminals electrical cable wires 14 being impacted by the environment. A thermal insulation sleeve (not shown in the figure) is further arranged on the surface of the positive and negative terminals electrical cable wires 14 and the system fluid pipe 13 disposed and extended in the outside of the enclosure 20 of the battery device (10+20), so as to further avoid or reduce the impact of the environmental temperature outside the enclosure 20 to the temperature of the battery device 10 accommodated in the inner space 101 of the enclosure 20.

FIG. 4b illustrates a battery system having thermal management design 100 according to an alternative mode to the above fourth embodiment, wherein the thermal insulation unit arranged on the enclosure 20 comprises a vacuum insulation plate (VIP) as the first thermal insulation material 22. The functions of the first thermal insulation material 22 have been disclosed in the embodiments illustrated in FIGS. 1 and 2 and will not be repeated here. The first thermal insulation material can be partially or fully filled in the sealing layer 201 of the enclosure 20, as illustrated in FIG. 2a-(1). The residual space of the sealing layer 201 of the thermal insulation unit of the enclosure 20 can further have the third thermal insulation material 24, as illustrated in FIG. 2a-(2), which would not be repetitively described here.

Figure 4C:
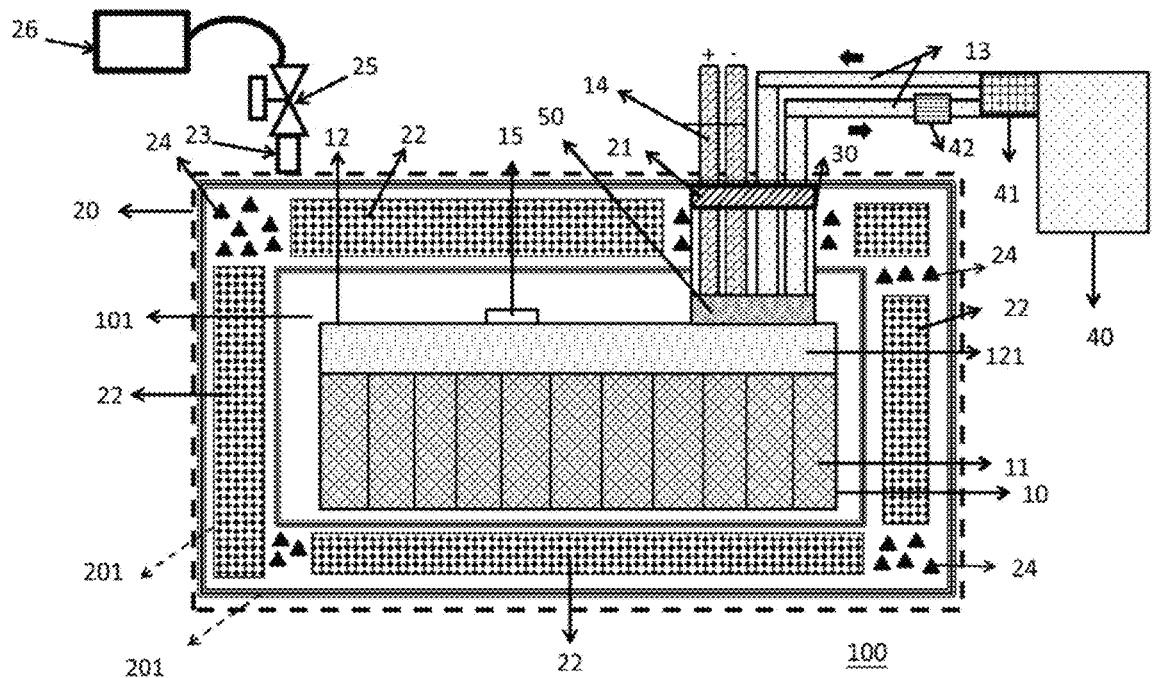

FIG. 4c illustrates a battery system having thermal management design 100 according to an alternative mode to the above fourth embodiment, as illustrated in FIG. 4c, wherein the enclosure 20 further comprises a seal perforation 23 arranged thereon, the valve joint 25, and the vacuum apparatus 26. If the first thermal insulation material 22 and the third thermal insulation material 24 have not fully filled out the sealing layer 201 of the thermal insulation unit, it can utilize the vacuum apparatus 26 to regulate the vacuum pressure of the residual space in the sealing layer 201. The vacuum pressure is basically lower than or equals to 0.01 Pa, or sometimes further lower than 0.001 Pa. The manner of arrangements, usage modes, and functions of the seal perforation 23, the valve joint 25, and the vacuum apparatus 26 are as mentioned in FIG. 1b and the above illustration, which would not be repeated here.

Figure 4D:
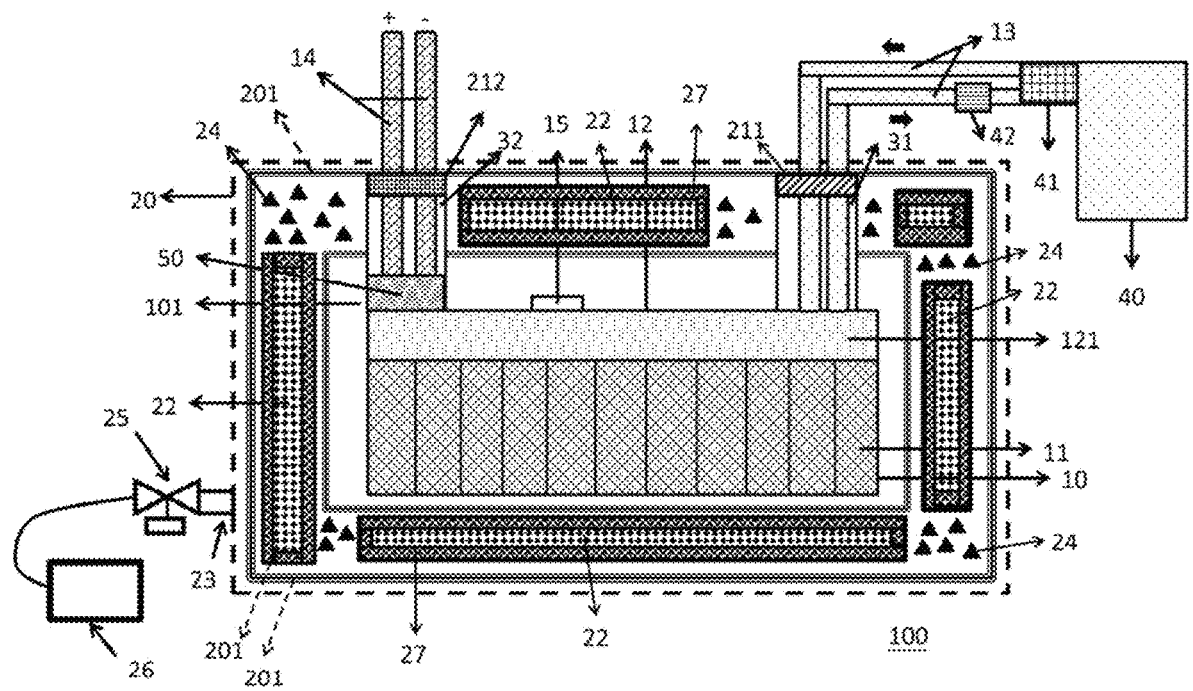

FIG. 4d illustrates a battery system having thermal management design 100 according to an alternative mode to the above fourth embodiment illustrated in FIG. 4c, wherein the enclosure 20 can further has a second channel 32 arranged thereon, wherein the thermal insulation sealing layer 211 and the thermal insulation sealing layer 212 are respectively arranged on the first channel 31 and the second channel 32. The first channel 31 is for arranging and disposing the system fluid pipe 13, while the second channel 32 is for arranging and disposing the positive and negative terminals electrical cable wires 14. Besides, the design of the enclosure 20 with a plurality of the channels (31, 32) is mainly to provide a more flexible arrangement for the space.

FIG. 4d illustrates a battery system having thermal management design 100 according to the alternative mode to the above fourth embodiment illustrated in FIG. 4c, wherein the heat exchangeable battery cell charging and discharging circuit formed and constructed by the battery cells 111 and the heat exchange pipe 131 part can be referred FIG. 3c, which has the metal structural element 80 provided and disposed between the battery cells 111 and the heat exchange pipe 131 and connects them by mean of ultrasonic bonding, so as to form the parallel set, as FIG. 3e-(1) illustrated. Then the parallel sets can be connected in series, so as to form the battery module having thermal management design 11 that has the heat exchangeable battery cell charging and discharging circuit with both positive and negative electrodes, as FIG. 3f illustrated (However, the quantity of the battery cells 111 illustrated previously is different than it of the present mode). When the battery device having thermal management design 10 formed by a plurality of the above battery modules having thermal management design 11 is to be charged under low temperature, it can utilize the system fluid delivery device 42 of the system fluid circulation system as illustrated in FIG. 4d to transport and distribute the system fluid 121 heated by the system fluid temperature control device 41 or the heated system fluid 121 stored in the system fluid storage device 40 to the flow channel device 12 of the battery device 10. According to the present mode, the module heat exchange interface applies an immediate contact design that the system fluid 121 directly contacts the outer tube of the heat exchange pipe 131 of the heat exchangeable battery cell charging and discharging circuit and transmits heat to the battery cells 111 through the metal structural element 80. Besides, according to the present mode, thanks to the thermal insulation effects of the first thermal insulation material 22, the second thermal insulation material 27, and the third thermal insulation material 24 disposed in the sealing layer 201 of the thermal insulation unit of the enclosure 20, the temperature of the heated battery cells 111 can stay for a long time so as for conducting secure charging process. Meanwhile, the metal structural element 80 is not only made of high thermal conductive material, but also a good electric conductor, which can be metallic material like copper, aluminum, and etc.. The heat exchange pipe 131 mentioned can be a heat pipe to be the module heat pipe.

Figure 4E:
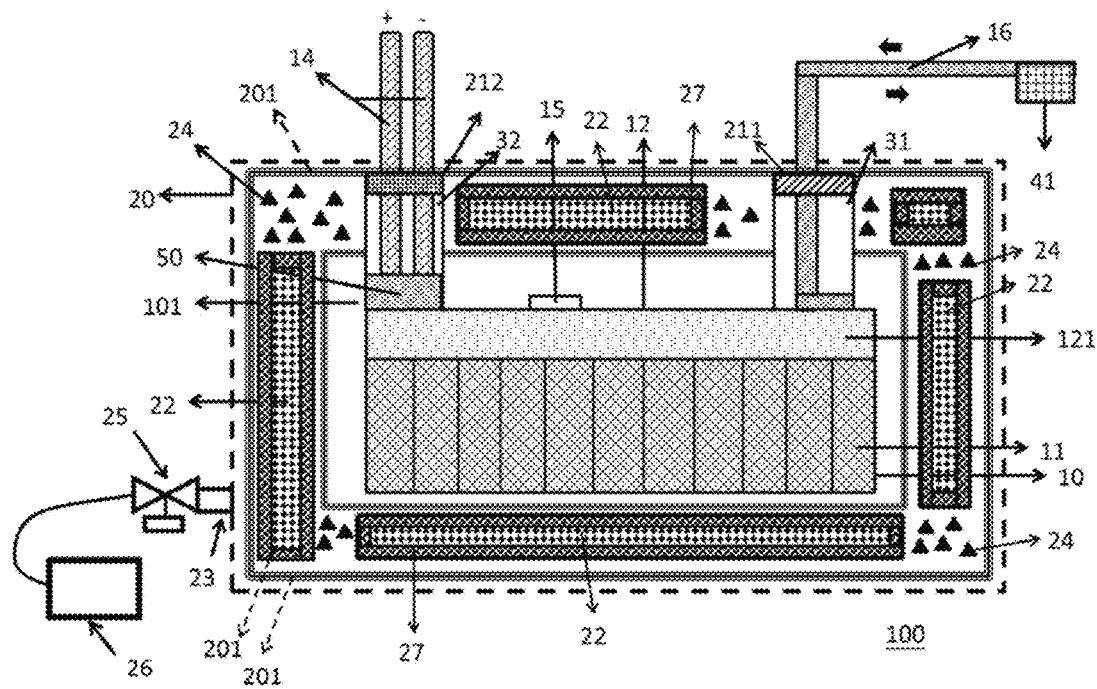

FIG. 4e illustrates a battery system having thermal management design 100 according to an alternative mode to the above fourth embodiment illustrated in FIG. 4d, wherein the system fluid 121, the system fluid pipe 13, and the flow channel device 12 are replaced by the system heat pipe 16 and the functioning mode thereof refers to FIG. 2g and the related description mentioned above. Also, the middle layer 161 refers to FIG. 3g- (4). The system heat pipe 16 directly contacts the system fluid temperature control device 41 and the system fluid 121 exists in the internal closed space of the system heat pipe 16 in a gas-liquid two-phase state. After the system fluid temperature control device 41 directly contacts an end of the system heat pipe 16 to control the temperature thereof, the conditioned gas-liquid two-phase system fluid 121 in the system heat pipe 16 can be automatically transported and distributed in liquid state without spending additional energy. Then it can conduct heat exchange in the middle layer 161 of the module heat exchange interface to the heat exchange pipe 131. Accordingly, it does not require the system fluid delivery device 42 and the system fluid storage device 40. After the heat exchange has taken place between the heat exchange pipe (not shown in the figure) of the battery module 11 and the middle layer 161 of the module heat exchange interface, the battery cells (not shown in the figure) connected with the heat exchange pipe can further exchange heat with the heat exchange pipe. Here the heat exchange pipe may be embodied as the module heat pipe.

Figure 4F:
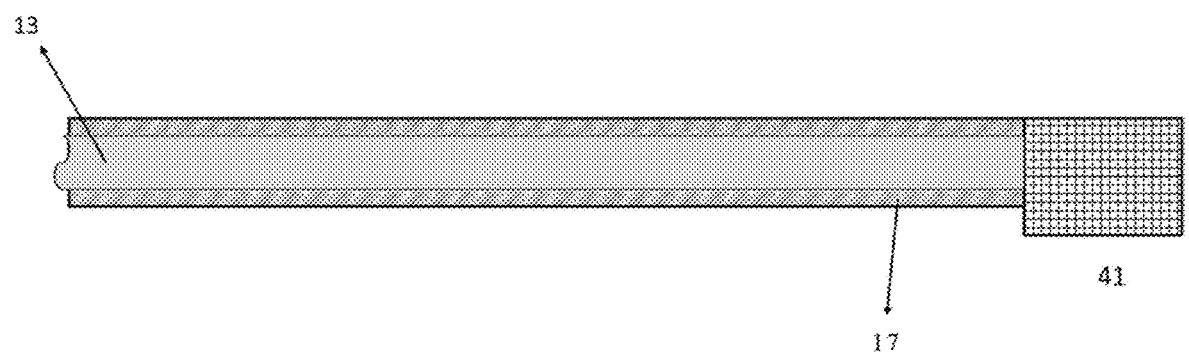

FIG. 4e illustrates a battery system having thermal management design 100 according to the above fourth embodiment, wherein the system heat pipe 16 can be substituted by a plurality of heat pipes, which enhances the flexibility and convenience of the application thereof. The heat pipes can be directly or indirectly contacted with one another to form good heat paths. For example, a plurality of the system heat pipes 16 can be connected and engaged in parallel. In this manner, the system fluid heat pipe (not shown in the figures) being formed and constructed by the system fluid 121 and the system fluid pipe 13 and the flow channel heat pipe (not shown in the figures) being formed and constructed by the system fluid 121 and the flow channel device 12 become a closed conduit to substitute a single system heat pipe, which an end thereof contacts the middle layer 161 for heat exchange. Here, the system fluid 121 can be a gas-liquid two-phase fluid as mentioned above and the quantity of the flow channel heat pipe can be one or more. Besides, the contact surface between the system fluid heat pipe and the flow channel heat pipe involves immediate contact. Nevertheless, it may also be indirect contact that relies on thermal interface materials or other materials having good heat conductivity and flat contact surface, so as to modify the contact surface between the system fluid heat pipe and the flow channel heat pipe and provide it good heat conduction. FIG. 4f illustrated a battery system having thermal management design 100 according to an alternative mode to the above fourth embodiment illustrated in FIGS. 4a-4e, wherein the system fluid circulation device, based on a different design, further has a thermal insulation sleeve sleeving on the system fluid pipe 13 that exchanges heat with the system fluid temperature control device 41, so as to avoid or reduce external thermal environment from influencing the temperature of the battery cells (not shown in this figure) and the battery module (not shown in this figure) of the battery device (not shown in this figure) through the system fluid pipe 13. In addition, the thermal insulation sleeve 17 may also be disposed on the surface of the positive and negative terminals electrical cable wires 14 of the battery device, avoid or reduce external thermal environment from influencing the temperature of the battery cells (not shown in this figure) and the battery module (not shown in this figure) of the battery device (not shown in this figure) therethrough.

Figure 4G:
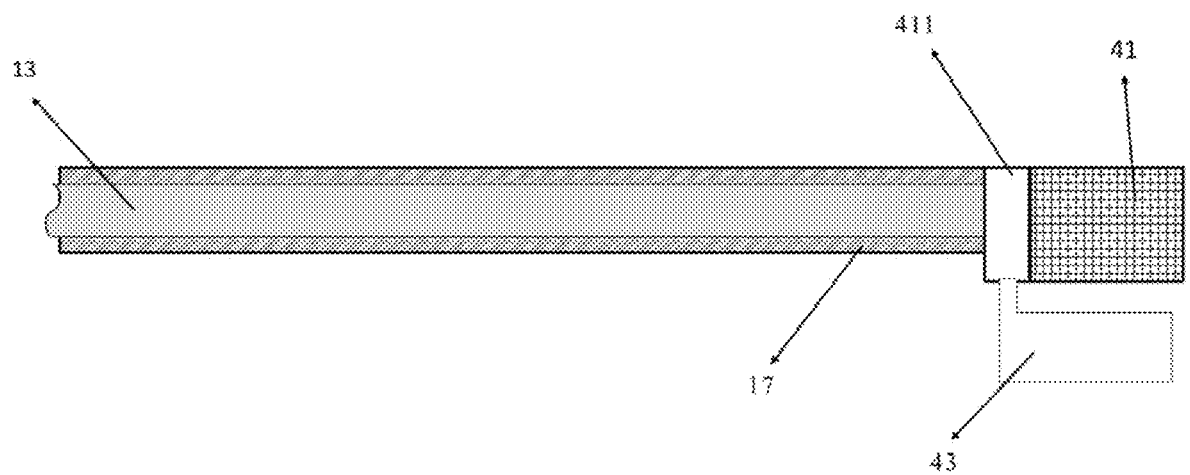

FIG. 4g illustrates a battery system having thermal management design 100 according to an alternative mode to the above fourth embodiment illustrated in FIG. 4g, wherein the system fluid temperature control device 41 further comprises a temperature control middle layer 411 arranged on the contact surface between the system fluid temperature control device 41 and the system fluid pipe 13. The temperature control middle layer 411 has fluid (not shown in the figure) serving as a heat transmission path between the system fluid pipe 13 and the system fluid temperature control device 41. The fluid, on the one hand, will be provided and disposed in the temperature control middle layer 411 when the battery module (not shown in the figure) of the battery device (not shown in the figure) requires heat dissipation or heating. On the other hand, the fluid will be removed and drawn out from the temperature control middle layer 411 and stored by a fluid extraction and storage device when it has to avoid or reduce the impact of environmental temperature to the battery module of the battery device.

Referring to FIGS. 4a-4e, the internal battery device 10 according to the above fourth embodiment further comprises a battery management system (BMS) 15 capable of sensing the voltage, temperature, and/or discharge capacity of the battery device, communicating with a master control device (not labelled in the figures) of the battery system, and conducting proper control activities.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A battery module having thermal management design, comprising:
one or more rechargeable secondary battery cells;
a module heat exchange interface, which is a main path of het exchange of said battery module, comprising a middle layer disposed therein; and
a heat exchangeable battery cell charging and discharging circuit comprising one or more heat exchange pipes and serving as a path for transmitting both heat and electric current, wherein said module heat exchange interface is formed by (i) at least part of a surface of an outer tube of at least one end of said one or more heat exchange pipes or said heat exchangeable battery cell charging and discharging circuit and (ii) a temperature control medium, serving as a medium for a temperature controlling source provided outside of said battery module to control a temperature of said battery module, wherein at least one of said at least part of said surface of said outer tube of said at least one end of said one or more heat exchange pipes and said heat exchangeable battery cell charging and discharging circuit directly or indirectly contacts said temperature control medium, wherein said middle layer is disposed in said module heat exchange interface in a manner that said at least part of said surface of said outer tube of said one or more heat exchange pipes or said heat exchangeable battery cell charging and discharging circuit indirectively contact said temperature control medium through said middle layer for heat exchange.

2. The battery module, as recited in claim 1, wherein said middle layer is selected from a group consisting of high heat conduction solid state electrical insulating layer, colloidal or gel state electrical insulating layer, electrical insulating liquid state fluid, and combinations thereof.

3. The battery module, as recited in claim 1, wherein said middle layer is a closed space containing a gas-liquid two-phase fluid.

4. The battery module, as recited in claim 1, wherein said temperature control medium is transported via a closed conduit in said module heat exchange interface, wherein said module heat exchange interface comprises said at least part of said surface of said outer tube of said at least one end of said one or more heat exchange pipes or said heat exchangeable battery cell charging and discharging circuit, said middle layer, said temperature control medium, and said outer tube of said closed conduit.

5. The battery module, as recited in claim 4, wherein said closed conduit and said temperature control medium are integrated into a heat pipe, wherein a quantity of said heat pipe is at least one.

* * * * *